(12) United States Patent
Momchilov et al.

(10) Patent No.: US 10,334,075 B2
(45) Date of Patent: Jun. 25, 2019

(54) VIRTUAL BROWSER INTEGRATION

(71) Applicant: Citrix Systems, Inc., Fort Lauderdale, FL (US)

(72) Inventors: Georgy Momchilov, Parkland, FL (US); Mukund Ingale, Pompano Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/472,798

(22) Filed: Mar. 29, 2017

(65) Prior Publication Data

US 2017/0339250 A1 Nov. 23, 2017

Related U.S. Application Data

(60) Provisional application No. 62/340,028, filed on May 23, 2016.

(51) Int. Cl.
*G06F 9/455* (2018.01)
*H04L 12/46* (2006.01)
(Continued)

(52) U.S. Cl.
CPC .......... *H04L 67/34* (2013.01); *G06F 9/45558* (2013.01); *H04L 12/4641* (2013.01); *H04W 12/06* (2013.01)

(58) Field of Classification Search
CPC ......... H04L 67/34; H04L 63/08; H04L 67/10; H04L 63/0272; H04L 67/101;
(Continued)

(56) References Cited

U.S. PATENT DOCUMENTS 5,956,716 A * 9/1999 Kenner ............. G06F 17/30017
8,010,679 B2 * 8/2011 Low ...................... G06F 3/1415
709/217

(Continued)

FOREIGN PATENT DOCUMENTS

WO 2016022712 A1 2/2016

OTHER PUBLICATIONS

Jul. 7, 2017 (WO) International Search Report and Written Opinion—App. PCT/US2017/033739.
(Continued)

*Primary Examiner* — Sargon N Nano
(74) *Attorney, Agent, or Firm* — Banner & Witcoff, Ltd.

(57) ABSTRACT

Methods, systems, and computer-readable media for integrating a virtual browser into a native browser and native web applications are presented. In some embodiments, a computing device may receive a request to open a first uniform resource locator. Subsequently, the computing device may determine that the first uniform resource locator is natively unsupported. Based on determining that the first uniform resource locator is natively unsupported, the computing device may launch a hosted virtual browser application in a virtual session hosted by a virtualization server. Thereafter, the computing device may receive, from the virtualization server, first hosted browser graphics generated by the hosted virtual browser application, and the first hosted browser graphics generated by the hosted virtual browser application may include content associated with the first uniform resource locator. Then, the computing device may present the first hosted browser graphics generated by the hosted virtual browser application.

20 Claims, 19 Drawing Sheets

(51) Int. Cl.
*H04L 29/08* (2006.01)
*H04W 12/06* (2009.01)

(58) Field of Classification Search
CPC ............... H04L 12/4641; G06Q 50/01; H04N 21/4782; H04W 12/06
See application file for complete search history.

(56) References Cited

U.S. PATENT DOCUMENTS

| | | | | |
|---|---|---|---|---|
| 8,806,354 B1* | 8/2014 | Hyndman | ........... | G06F 3/04883 709/204 |
| 8,869,300 B2* | 10/2014 | Singh | ........... | G06F 21/53 709/225 |
| 8,924,528 B1* | 12/2014 | Richardson | ........... | H04L 47/70 709/217 |
| 2006/0010433 A1* | 1/2006 | Neil | ........... | G06F 9/45533 717/138 |
| 2007/0239859 A1* | 10/2007 | Wilkinson | ........... | G06F 9/505 709/220 |
| 2010/0169795 A1* | 7/2010 | Hyndman | ........... | G06F 9/542 715/757 |
| 2010/0319051 A1* | 12/2010 | Bafna | ........... | G06F 21/6218 726/1 |
| 2011/0173644 A1* | 7/2011 | Teng | ........... | G06F 3/1415 719/329 |
| 2013/0014033 A1* | 1/2013 | Hamick | ........... | G06Q 50/01 715/757 |
| 2013/0160099 A1 | 6/2013 | Fitzpatrick, III | | |
| 2014/0189777 A1 | 7/2014 | Viswanathan et al. | | |
| 2014/0297839 A1 | 10/2014 | Qureshi | | |
| 2015/0026682 A1* | 1/2015 | Singh | ........... | G06F 21/53 718/1 |
| 2015/0235126 A1* | 8/2015 | de Borst | ........... | H04L 47/10 706/47 |
| 2015/0339216 A1* | 11/2015 | Wade | ........... | G06F 11/3688 714/38.1 |

OTHER PUBLICATIONS

Nov. 27, 2018 (WO) International Preliminary Report on Patentability—App. PCT/US2017/033739.

\* cited by examiner

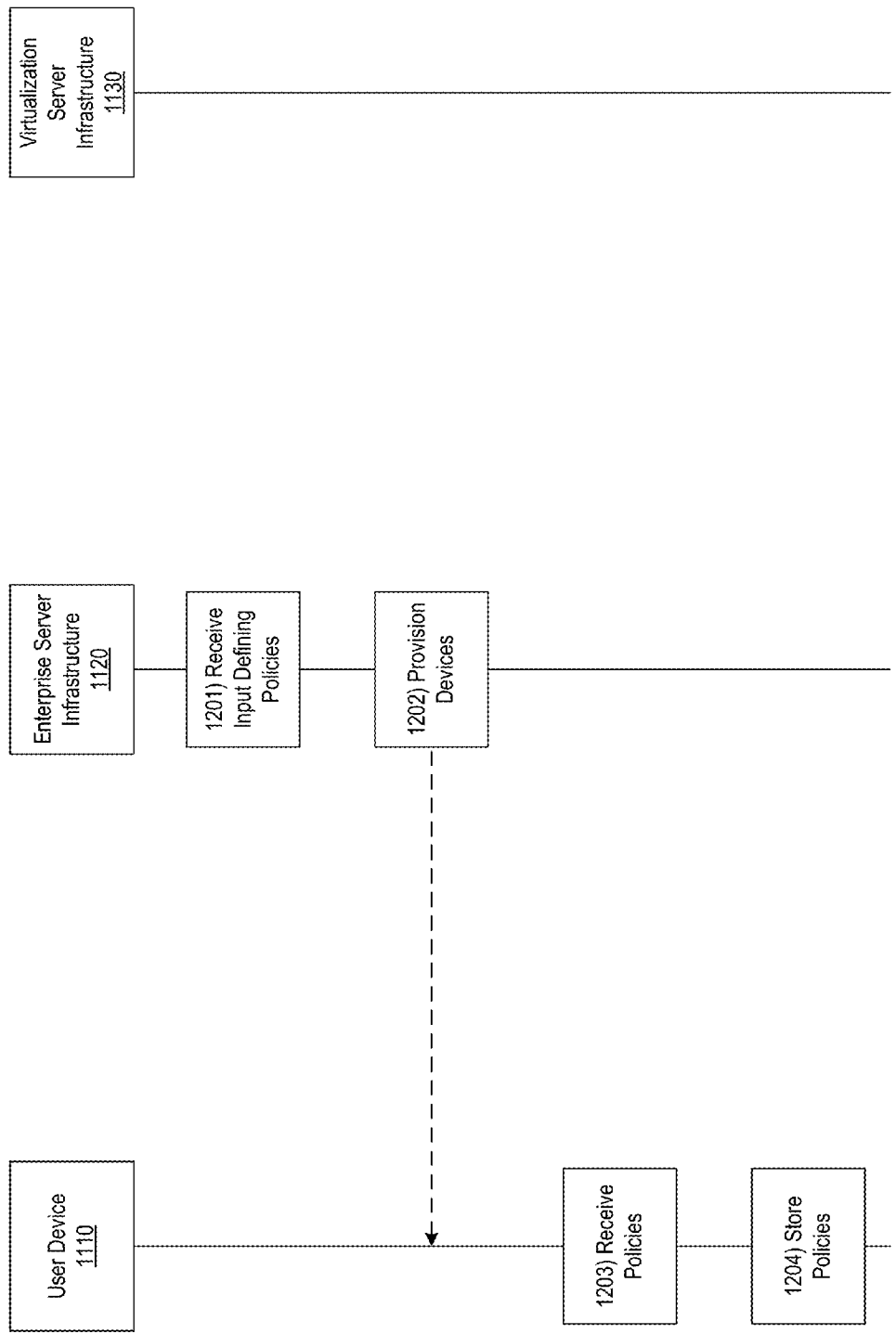

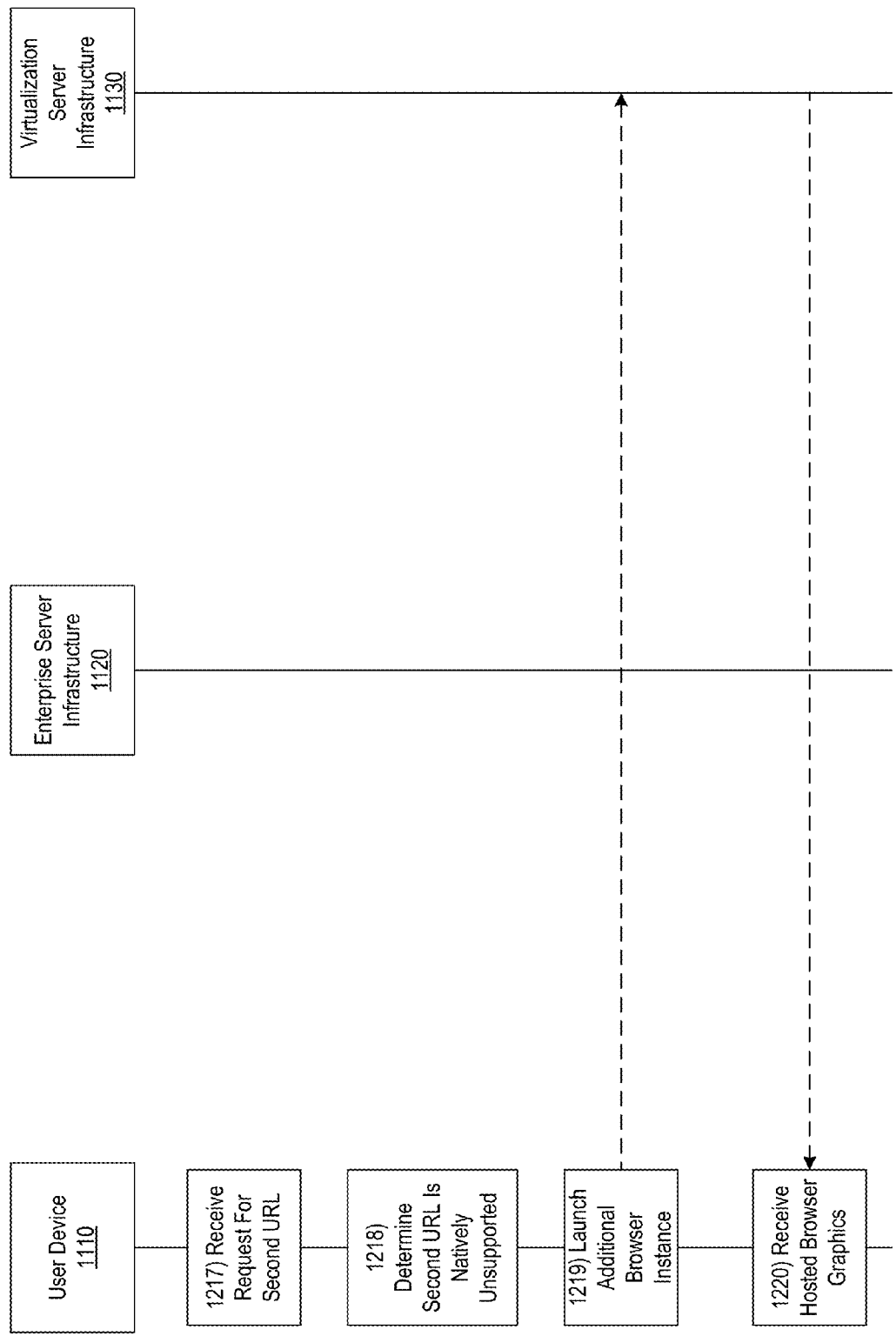

VIRTUAL BROWSER INTEGRATION

CROSS-REFERENCE TO RELATED APPLICATIONS

This application claims the benefit of priority to U.S. Patent Application Ser. No. 62/340,028, filed May 23, 2016, and entitled "INTEGRATING A VIRTUAL BROWSER INTO A NATIVE BROWSER AND NATIVE WEB APPLICATIONS," which is hereby incorporated by reference in its entirety for all purposes.

FIELD

Aspects of the disclosure relate to computer hardware and software. In particular, one or more aspects of the disclosure relate to computer hardware and software for integrating a virtual browser into a native browser and native web applications.

BACKGROUND

Enterprise organizations and their employees and other associated users are increasingly using mobile computing devices to engage in a variety of functions, such as sending and receiving email, managing calendars and tasks, creating and viewing content, accessing and modifying enterprise information, and executing other functions. As such mobile devices are increasingly adopted and used, it is increasingly important for organizations to control and/or otherwise manage how such devices are used and/or what information they can access so as to protect the safety and security of enterprise information and other enterprise resources. In some instances, however, this may present technical challenges.

SUMMARY

Aspects of the disclosure provide technical solutions that may address and overcome one or more technical challenges associated with controlling and/or managing access to enterprise information and other enterprise resources by mobile devices and/or mobile applications.

In particular, one or more aspects of the disclosure provide ways of integrating a virtual browser into a native browser and native web applications. For example, by implementing one or more aspects of the disclosure, a virtual browser may be seamlessly integrated into a native browser for enabling and/or otherwise providing access to natively unsupported content and/or for enhancing and/or otherwise providing more security. In addition, such a virtual browser may be used to enable and/or otherwise provide access to native "web" applications so as to provide both native user experience as well as full-blown web application functionality.

For instance, a computing platform having at least one processor, a memory, and a communication interface may receive a request to open a natively unsupported uniform resource locator. In response to receiving the request to open the natively unsupported uniform resource locator, the computing platform may launch a hosted virtual browser application. Subsequently, the computing platform may display graphics generated by the hosted virtual browser application, and the graphics generated by the hosted virtual browser application may include content associated with the natively unsupported uniform resource locator.

In accordance with one or more embodiments, a computing device having at least one processor, a communication interface, and a memory may receive a request to open a first uniform resource locator. Subsequently, the computing device may determine that the first uniform resource locator is natively unsupported. Based on determining that the first uniform resource locator is natively unsupported, the computing device may launch a hosted virtual browser application in a virtual session hosted by a virtualization server. Thereafter, the computing device may receive, via the communication interface, from the virtualization server, first hosted browser graphics generated by the hosted virtual browser application, and the first hosted browser graphics generated by the hosted virtual browser application may include content associated with the first uniform resource locator. Then, the computing device may present the first hosted browser graphics generated by the hosted virtual browser application.

In some embodiments, determining that the first uniform resource locator is natively unsupported may include determining that the first uniform resource locator is natively unsupported based on at least one enterprise policy defining one or more natively unsupported uniform resource locators. In some embodiments, determining that the first uniform resource locator is natively unsupported may include determining that the first uniform resource locator is natively unsupported based on detecting a failure to load one or more elements associated with the first uniform resource locator. In some embodiments, determining that the first uniform resource locator is natively unsupported may include determining that the first uniform resource locator is natively unsupported based on identifying that the first uniform resource locator corresponds to a stub application associated with a hosted web application.

In some embodiments, launching the hosted virtual browser application in the virtual session hosted by the virtualization server may include establishing a connection to the virtualization server and authenticating with the virtualization server using one or more cached authentication credentials. In some instances, authenticating with the virtualization server using the one or more cached authentication credentials may include authenticating with the virtualization server using at least one cached single sign-on (SSO) credential linked to an enterprise user account.

In some embodiments, presenting the first hosted browser graphics generated by the hosted virtual browser application may include maintaining a stack of browsing transitions associated with browsing activity.

In some embodiments, prior to receiving the request to open the first uniform resource locator, the computing device may receive, via the communication interface, from an enterprise server, one or more enterprise policies, and the one or more enterprise policies may include at least one enterprise policy defining one or more natively unsupported uniform resource locators. Subsequently, the computing device may store the one or more enterprise policies for enforcement on the computing device by at least one policy management agent.

In some embodiments, prior to receiving the request to open the first uniform resource locator, the computing device may authenticate a user of the computing device. Based on authenticating the user of the computing device, the computing device may cache one or more authentication credentials associated with the user of the computing device.

In some embodiments, the computing device may receive input interacting with the first hosted browser graphics generated by the hosted virtual browser application and presented by the computing device. Subsequently, the computing device may send, via the communication interface, to the virtualization server, the input interacting with the first hosted browser graphics generated by the hosted virtual browser application and presented by the computing device. Thereafter, the computing device may receive, via the communication interface, from the virtualization server, updated hosted browser graphics generated by the hosted virtual browser application. Additionally, the computing device may present the updated hosted browser graphics generated by the hosted virtual browser application. In some instances, receiving the input interacting with the first hosted browser graphics generated by the hosted virtual browser application and presented by the computing device may include updating a stack of browsing transitions based on the input interacting with the first hosted browser graphics generated by the hosted virtual browser application and presented by the computing device.

In some embodiments, the computing device may receive a request to open a second uniform resource locator. Subsequently, the computing device may determine that the second uniform resource locator is natively unsupported. Based on determining that the second uniform resource locator is natively unsupported, the computing device may launch an additional instance of the hosted virtual browser application in the virtual session hosted by the virtualization server. Thereafter, the computing device may receive, via the communication interface, from the virtualization server, second hosted browser graphics generated by the additional instance of the hosted virtual browser application, and the second hosted browser graphics may include content associated with the second uniform resource locator. Then, the computing device may present the second hosted browser graphics generated by the additional instance of the hosted virtual browser application.

In some embodiments, presenting the first hosted browser graphics generated by the hosted virtual browser application may include presenting the first hosted browser graphics in a first tab of a local browser application, and presenting the second hosted browser graphics generated by the additional instance of the hosted virtual browser application may include presenting the second hosted browser graphics in a second tab of the local browser application different from the first tab of the local browser application. In some instances, presenting the second hosted browser graphics generated by the additional instance of the hosted virtual browser application may include maintaining a first stack of browsing transitions associated with first browsing activity in the first tab of the local browser application and maintaining a second stack of browsing transitions associated with second browsing activity in the second tab of the local browser application.

In some embodiments, the computing device may receive a request to open a third uniform resource locator. Subsequently, the computing device may determine that the third uniform resource locator is natively supported. Based on determining that the third uniform resource locator is natively supported, the computing device may access the third uniform resource locator using a local browser application.

These features, along with many others, are discussed in greater detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and in which:

FIGS. 12A-12F depict an example event sequence for integrating a virtual browser into a native browser and native web applications in accordance with one or more illustrative aspects described herein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
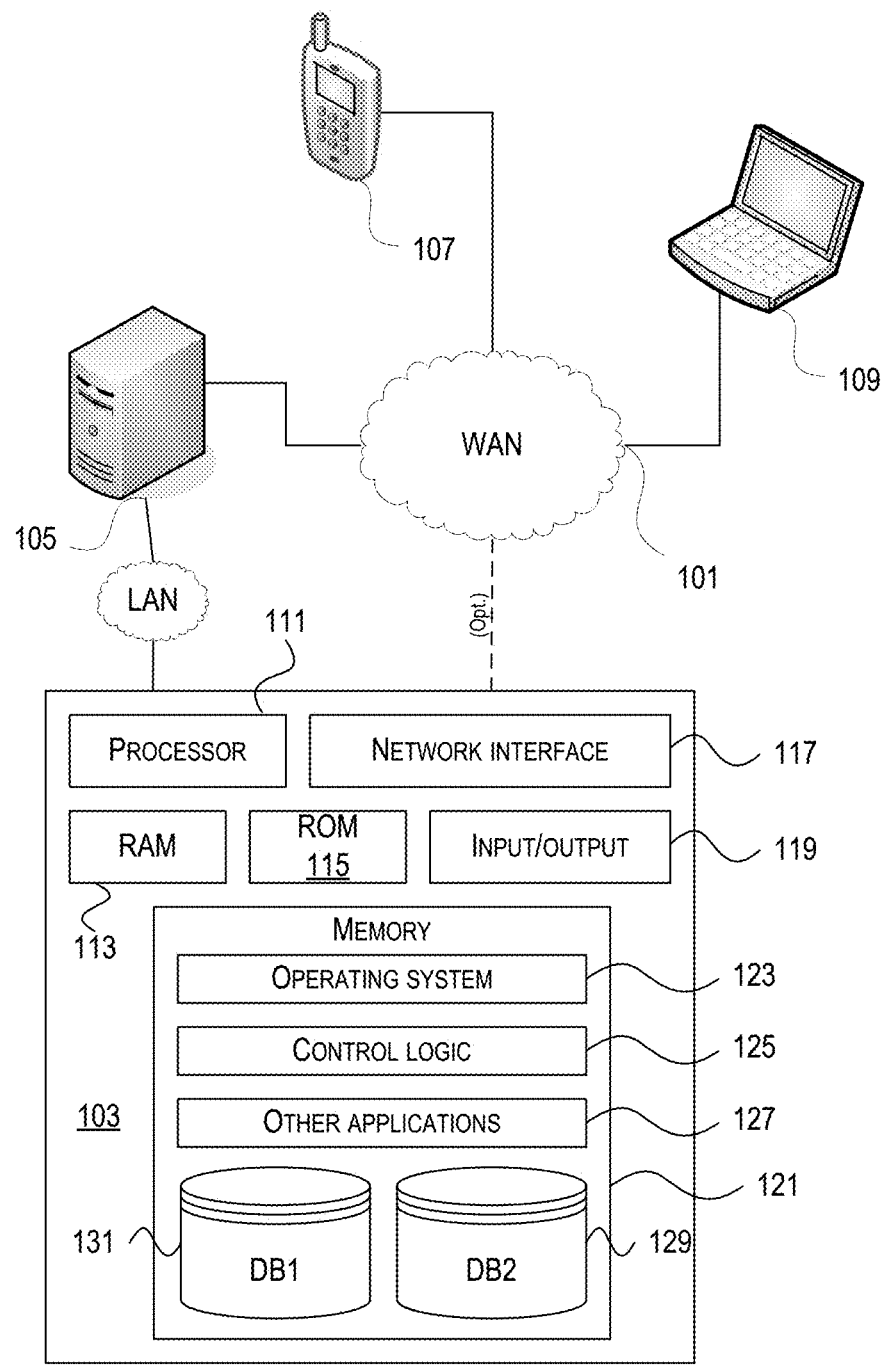
FIG. 1 depicts an illustrative computer system architecture that may be used in accordance with one or more illustrative aspects described herein.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
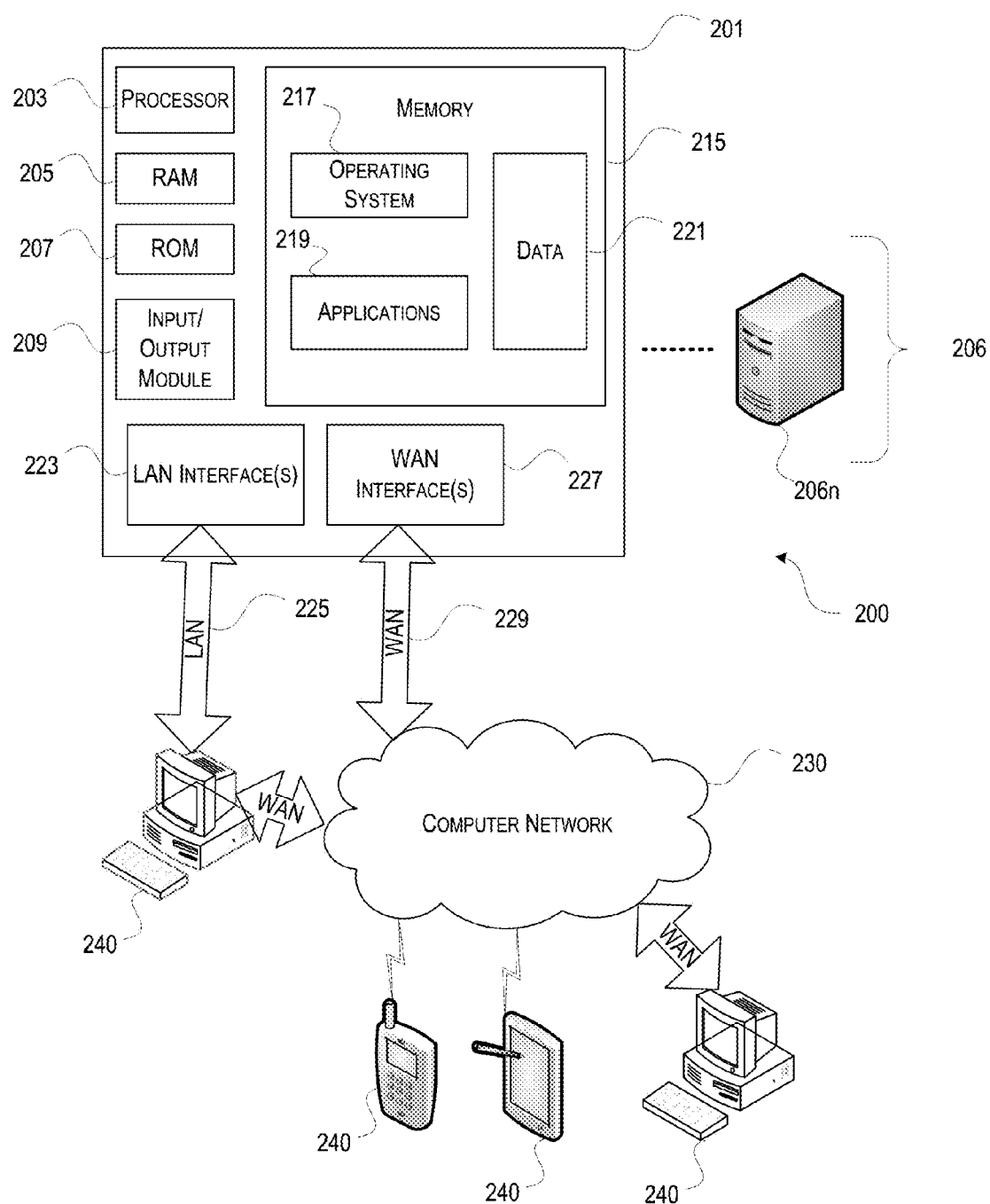
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) configured to provide virtual machines for client access devices. The computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
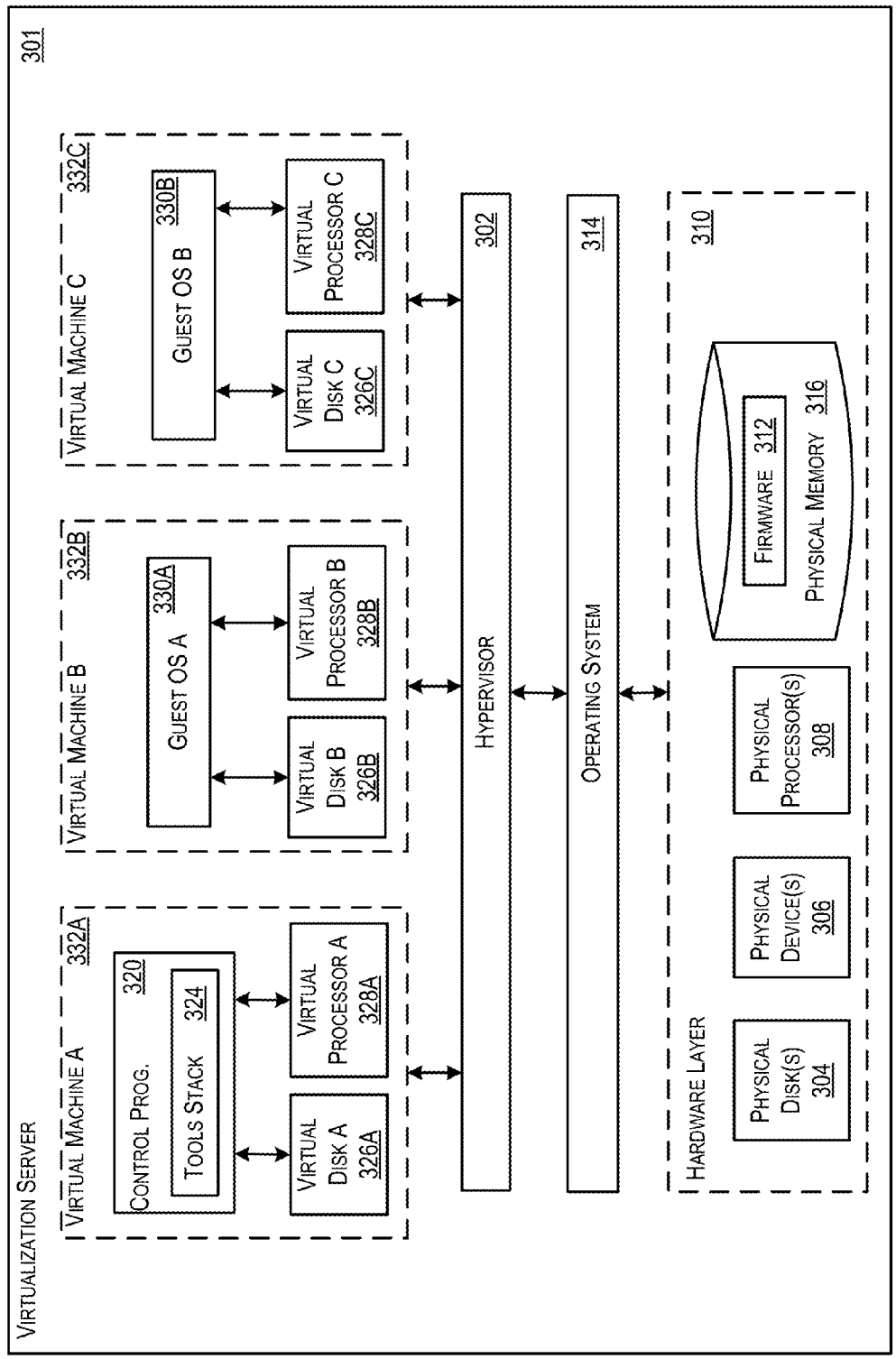
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
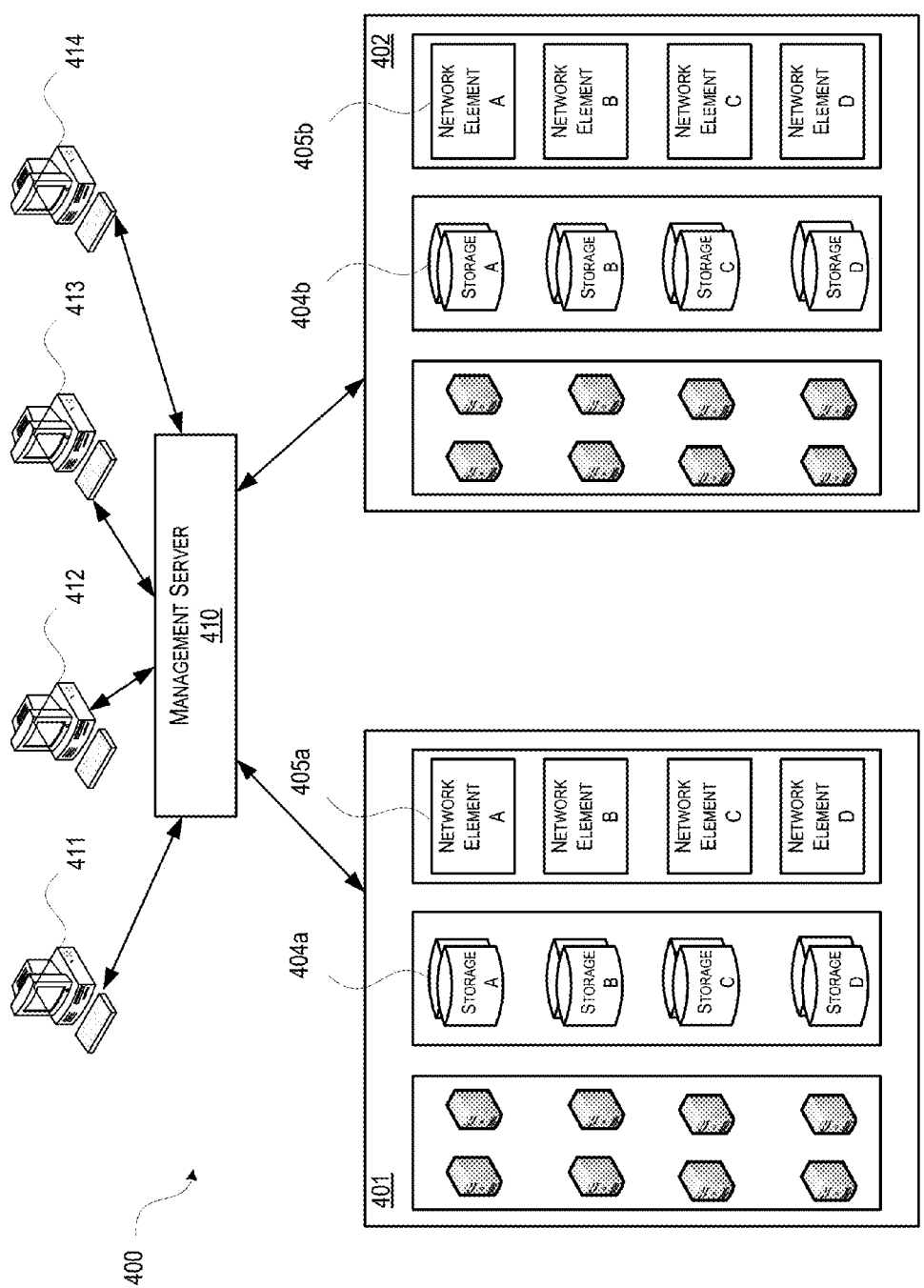
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDPLATFORM by Citrix Systems, Inc.

of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
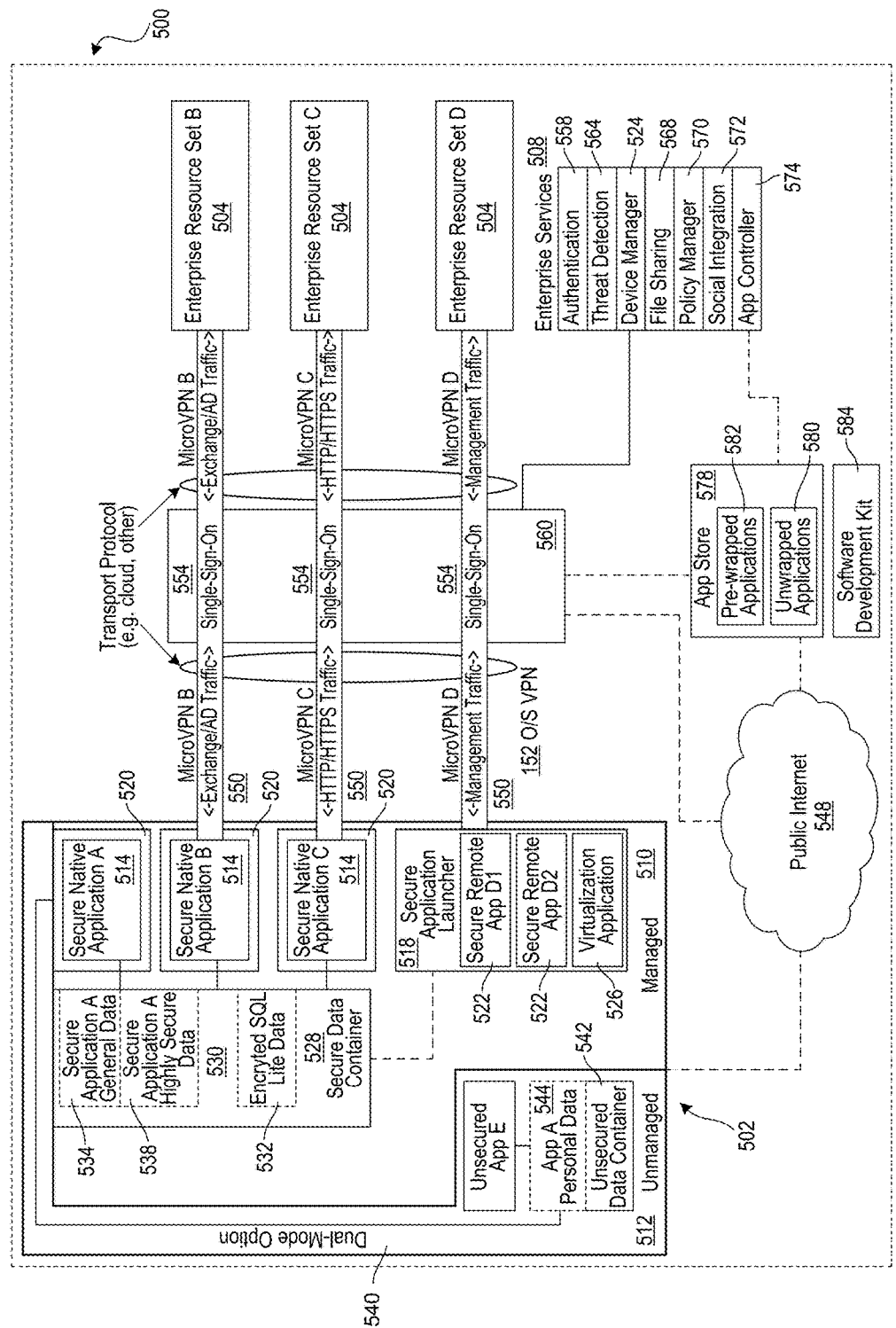
FIG. 5 depicts an illustrative enterprise mobility management system in accordance with one or more illustrative aspects described herein.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as an enrolled device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like.

The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a graphical user interface (GUI) and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUIs and then record user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
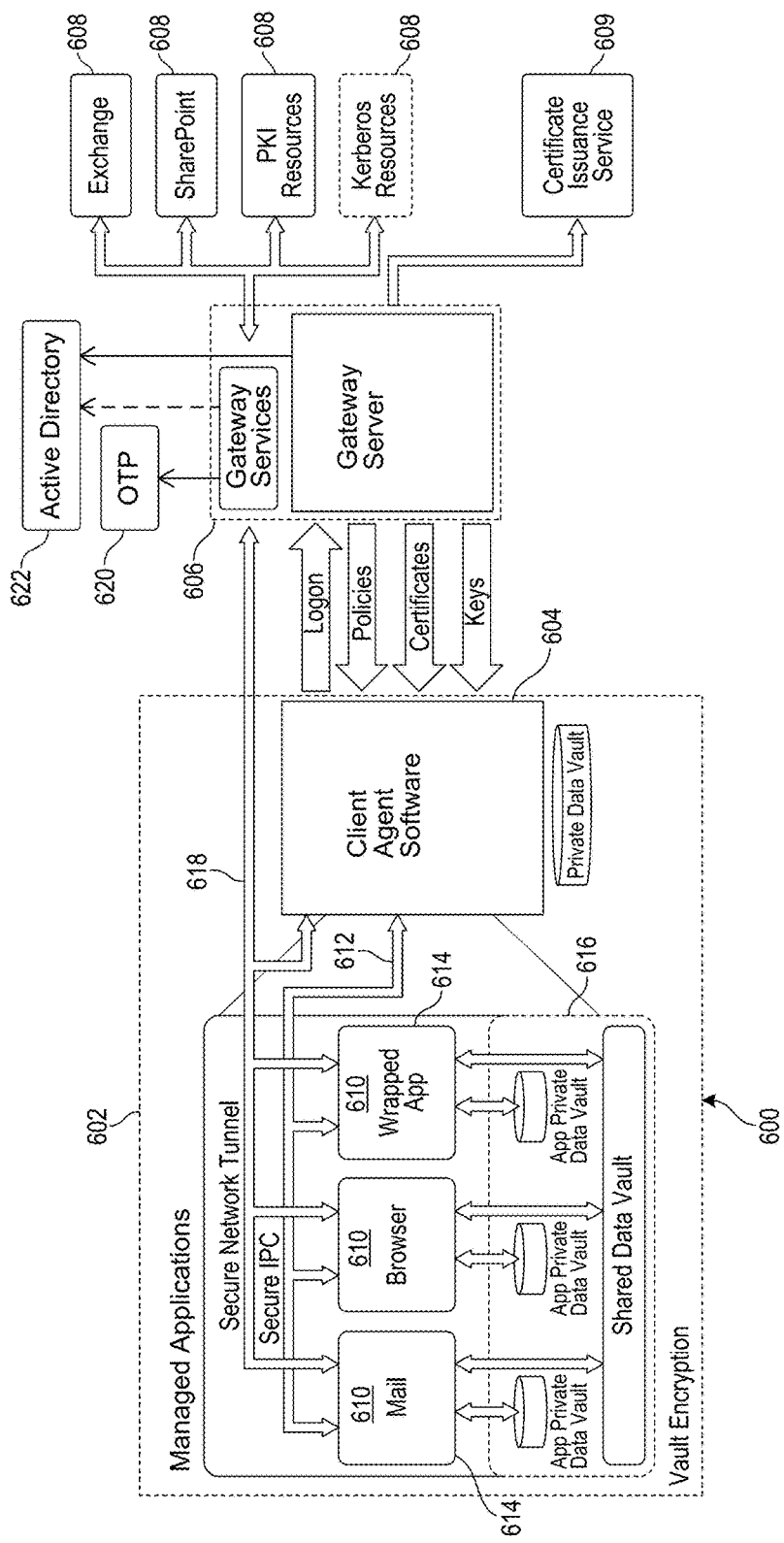
FIG. 6 depicts another illustrative enterprise mobility management system in accordance with one or more illustrative aspects described herein.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in FIG. 6 are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure interprocess communication (IPC) links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate active directory (AD) passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a public-key cryptography standards (PKCS) 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to Active Directory (AD) 622, using an AD password or trusted client certificate, and obtain Kerberos service tickets to respond to HTTP Negotiate authentication challenges. The limited support feature relates to constrained delegation in Citrix Access Gateway Enterprise Edition (AGEE), where AGEE supports invoking Kerberos protocol transition so it can obtain and use Kerberos service tickets (subject to constrained delegation) in response to HTTP Negotiate authentication challenges. This mechanism works in reverse web proxy (aka corporate virtual private network (CVPN)) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of enterprise application store and an application controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Integrating a Virtual Browser into a Native Browser and Native Web Applications

One or more aspects of the disclosure may incorporate, be embodied in, and/or be implemented using one or more of the computer system architecture, remote-access system architecture, virtualized (hypervisor) system architecture, cloud-based system architecture, and/or enterprise mobility management systems discussed above in connection with FIGS. 1-6. In addition, the following acronyms may be used in the disclosure: High Definition Experience (HDX); Mobile Application Management (MAM); Mobile Device Management (MDM); Mobile Device Experience (MDX); Proof of Concept (POC); Shared Secret Vault (SSV); Store-Front (SF); Virtual Channel (VC); WorxHome (WH); XenApp (XA); XenDesktop (XD); and XenMobile Server (XMS).

As discussed above, one or more aspects of the disclosure provide ways of integrating a virtual browser into a native browser and native web applications. For example, by implementing one or more aspects of the disclosure, a virtual browser may be seamlessly integrated into a native browser for enabling and/or otherwise providing access to natively unsupported content and/or for enhancing and/or otherwise providing more security. In addition, such a virtual browser may be used to enable and/or otherwise provide access to native "web" applications so as to provide both native user experience as well as full-blown web application functionality.

In a first use case, a native browser, such as CITRIX WorxWeb, running on a particular computing device, such as a particular user's mobile device, may open a uniform resource locator (URL) into an HDX virtual browser to provide access to unsupported content (which might, e.g., not be displayable in the native browser on the mobile device) and/or to provide more security (which might, e.g., not be provided by the native browser on the mobile device). There may be one or more operating assumptions underlying this first use case. For example, WorxWeb may be the primary use case. In addition, this approach may be useful for FLASH content or other content that cannot be rendered by native browsers or Web View controls on mobile devices. Additionally, this approach may be useful for situations in which there is unmatched mobile security, as the approach allows for handling of web content at the server backend. Further, the virtual browser might not need to redirect URLs back to the local application (e.g., no reverse URL redirection). As a secondary use case, this approach also may be applied to desktop browsers like INTERNET EXPLORER, CHROME, and/or FIREFOX.

In a second use case, a virtual browser may be used to enable and/or otherwise provide access to mobile "web" applications. For example, some mobile applications, such as WorkDay, may have limited functionality relative to their respective full-blown web applications. In addition, some web sites, such as the WorkDay web site, might not be designed for mobile browsers. Aspects of the disclosure may allow users to access a web application like WorkDay from the mobile device springboard. In particular, aspects of the disclosure may provide the user with both a native user experience and full-blown web application functionality.

In a third use case, CITRIX XenMobile MDM and MAM/MDX security may applied and combined with the first use case and the second use case discussed above, so as to provide enhanced security in both approaches.

Core Implementation

In a core implementation of one or more aspects of the disclosure, which may represent a basic design for implementing one or more aspects of the disclosure, a native WorxWeb application may be integrated with a Virtual Browser for select web content. In this arrangement, a full-screen HDX view may be provided. A remote browser (e.g. a remote instance of INTERNET EXPLORER) may be invoked via HDX for select web content. The remote browser may run in a kiosk mode with no chrome around it. In addition, a modified HDX Session Control user interface allowing a user to go back from the remote browser to a native WorxWeb view may be provided. Single remote tab support also may be provided.

Figure 7:
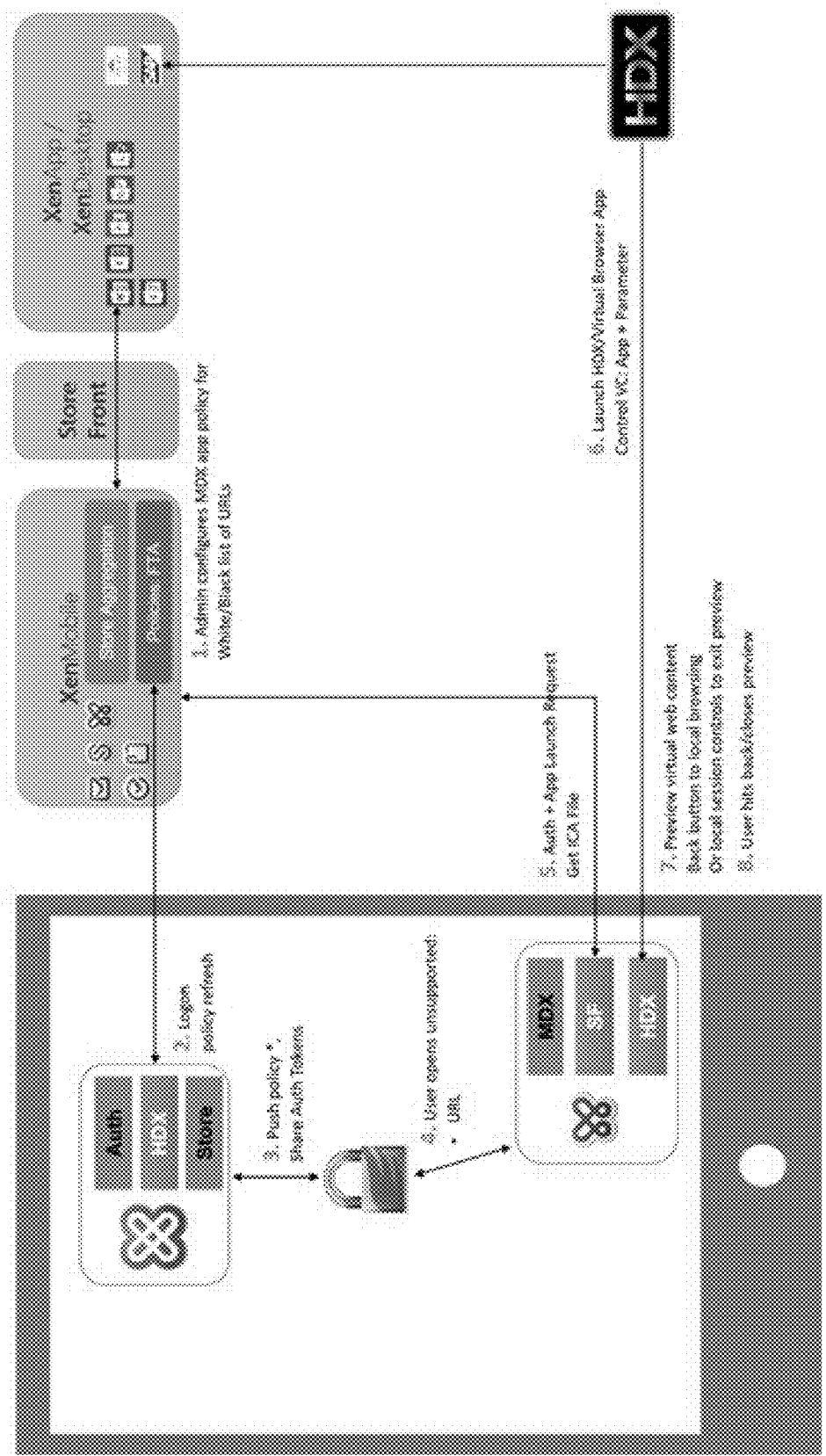
FIGS. 7-9 depict examples related to integrating a virtual browser into a native browser and native web applications in accordance with one or more illustrative aspects described herein.

FIG. 7 illustrates an example of the architecture that may be used in integrating a virtual browser into a native browser and native web applications in accordance with one or more aspects of the disclosure.

In the deployment and configuration illustrated in FIG. 7, an administrator may configure XenMobile server with a WorxWeb application MDX Policy for a White/Black list of URLs. As a secure browser, WorxWeb may be configured and/or designed to (1) have an association with URLs from MDX apps; and/or (2) open select URLs using StoreFront and HDX software development kits (SDKs) and redirect such URLs to a virtual browser. In some instances, there may be one or more dependencies based on MDX policy, SF/Auth SDK, and/or MDX SDK. Additionally or alternatively, XenApp Server may be leveraged with a published browser or XenApp Browser Server.

In the deployment and configuration illustrated in FIG. 7, an example runtime sequence of operations may occur as follows. First, an administrator may configure a WorxWeb MDX application policy to define a white list and/or black list of URLs. Second, a user may log on to XenMobile Server via WorxHome, and WorxHome may perform a policy refresh. Third, WorxHome may push policies and/or share authentication tokens with other MDX apps. In some instances, Shared Secret Vault (SSV) and MDX vault may be used for sharing. In addition, WorxWeb may read the MDX application policy to turn URL redirection on and/or off and to receive the white list and/or black list of URLs. In an alternative design, WorxWeb and other MDX applications may independently perform a policy refresh from XenMobile Server and also may independently network-authenticate to XenMobile Server. This approach may be referred to as "distributed authentication" without WorxHome as a single master application.

Referring again to the example runtime sequence of operations in the deployment and configuration illustrated in FIG. 7, at a fourth step, a user may open an unsupported URL. Fifth, WorxWeb may use a StoreFront SDK to talk to StoreFront. This may include authentication using a shared authentication token, sending an application launch request, and obtained an ICA file (which may, e.g., describe the properties of an HDX connection to be launched, such as the server address and/or initial application, such as INTERNET EXPLORER).

Sixth, WorxWeb may launch an HDX Virtual Browser application. This may include launching an HDX connection based on the obtained ICA file and using a control virtual channel to launch an application and supply parameters (e.g., supply application, e.g., path to INTERNET EXPLORER). In addition, parameters may be appended, for example, indicating the redirected URL to launch and/or indicating to run an application in "kiosk" mode, as discussed in greater detail below.

Seventh, WorxWeb may preview virtual web content. This may include displaying HDX graphics from the remote application (e.g. INTERNET EXPLORER running in kiosk mode with content from the redirected URL opened by the remote browser). A back button may be provided to enable the user to return to local web browsing. Additionally or alternatively, local HDX session controls may enable the user to exit a preview of the URL in the virtual browser.

Subsequently, at an eighth step, the user may select the back button or close preview button. This may return the user and the processing to local WorxWeb browsing.

Figure 8:
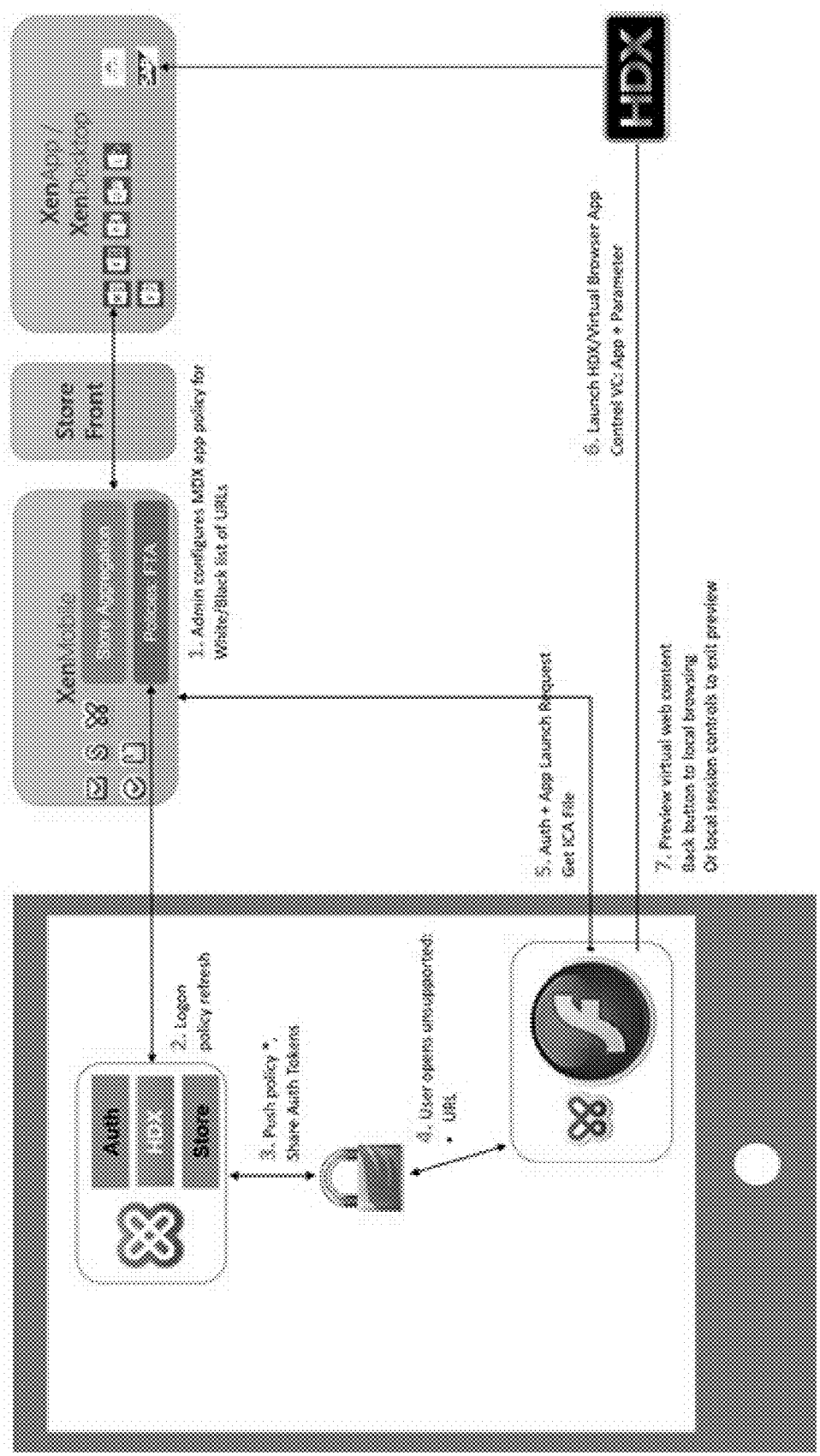

FIG. 8 illustrates another example of integrating a virtual browser into a native browser and native web applications in accordance with one or more aspects of the disclosure. In particular, in the example illustrated in FIG. 8, FLASH content may be presented in the mobile application browser. The example illustrated in FIG. 8 is similar to the example illustrated in FIG. 7, but in the example illustrated in FIG. 8, an HDX preview of FLASH content is presented in the native WorxWeb application (which, e.g., might not normally be allowed on mobile platforms).

In some instances, Kiosk Mode of INTERNET EXPLORER may be used in implementing one or more aspects of the disclosure. When INTERNET EXPLORER is run in kiosk mode, the title bar, menus, toolbars, and status bar might not be displayed, and the browser may run in full screen mode. When implementing aspects of the disclosure using other browsers that might not support a similar kiosk mode, the facilities of the HDX Seamless VC protocol may be used to distinguish between client and non-client window areas. In this way, WorxWeb may remove the non-client areas of the remote browser from the local graphics display and might only show the client areas (which may, e.g., include the web content).

Extended Design

In an extended design implementation of one or more aspects of the disclosure, one or more additional advanced features, discussed below, may be combined with one or more of the features discussed above in integrating a virtual browser into a native browser and native web applications.

For example, one advanced feature that may be included is complex HDX view resizing. In particular, in previewing the remote browser, WorxWeb may offer different user experience options to the user for panning and scaling. For example, a full screen (fit to screen) option with automatic scaling of the remote session if necessary may be provided. Additionally or alternatively, an actual remote session size plus scrollbars option may be provided. Additionally or alternatively, a percentage of remote session size plus scrollbars option may be provided.

Another advanced feature that may be included is local user interface controls for mixed local and remote browsing. When implementing this feature, the goal may be to enable the user to browse local and remote URLs seamlessly without noticing that some URLs are handled locally via the native WebView control, while others are handled remotely via the published browser. This seamless experience may also apply to user interface button controls such as Back, Forward, and/or the like. WorxWeb might only present local user interface button controls, which may redirect their actions to either the native WebView control or the published browser window controls depending on context. In some instances, for this to happen, WorxWeb might need to keep track of the history of URL transitions. A data structure may be used to store an array of objects containing: URL link; a boolean indicating local vs. remote handling of the URL; and a current number and/or pointer in the sequence of URL transitions (e.g., combined local and remote stack).

To obtain details on URL link transitions actually occurring in the remote browser, a Browser Helper Object (BHO) or other browser-dependent plugin may be used in the remote browser to communicate this metadata to WorxWeb over an HDX VC. In addition, WorxWeb may control remote back and/or forward operations via local back and/or forward controls that are designed to send a keyboard shortcut via an HDX VC to the remote browser (e.g. Alt-Left-Arrow-Key and Alt-Right-Arrow-Key, respectively). Depending on the context with the browsing history (e.g., using the data structure discussed above), the same local back and/or forward controls may apply to the local WebView control browsing session.

In some instances, a simplifying assumption may be made that there is no URL redirection from the remote browser back to the local browser, other than backtracking with the Back button. When using this assumption, the actual remote URL links being opened might not need to be communicated, and instead only the act of remote URL transitions might be communicated.

Another advanced feature that may be included is multi-tab support for a remote browser. When implementing this feature, there may be no HDX session sharing in some instances. For example, each tab may be handled within a separate HDX session and there might not be a need to keep track of separate remote processes. The designs discussed above may be applied per each separate tab. Some disadvantages with this approach may be that XenApp Server scalability may be impacted, and the initial HDX connect time for each separate session may be longer.

In other instances, when implementing multi-tab support for a remote browser, there may be HDX session sharing. For example, separate remote browsers may be launched in the same HDX session for each local tab and may be tracked via existing seamless VC protocol (which may, e.g., provide a complete hierarchy of published applications and corresponding trees of remote processes and windows). This approach may be more complex, but it may favor XenApp Server scalability as well as instantaneous launch time for each subsequent browser after the initial launch.

In some arrangements, a browser plugin may be provided to extend a native browser. In particular, WorxWeb may be considered a native custom browser for mobile platforms. The same concept may be applied to native browsers for desktop operating systems. For example, URLs may be redirected to a remote hosted browser by means of browser plugins for INTERNET EXPLORER, CHROME, and/or FIREFOX when running on a WINDOWS operating system, MAC OS X operating system, and/or LINUX operating system. Such a browser plugin may use CTRIX HTML5 Receiver for remoting and may be enhanced with a custom VC for controlling the remote browser as discussed above.

In some arrangements, mobile "web" application features may be provided. For example, to achieve a mobile "web" application (e.g., WorkDay on mobile device springboard), a combination or crosspollination of the WorxWeb with embedded HDX Browser design discussed above and the mobile HDX native applications design might be required. In providing HDX native applications on a mobile device springboard, a template HDX SDK application may be customized to look and feel like a specific native application corresponding to a published application (e.g., Microsoft WORD).

For example, an HDX native application may be deployed on the springboard via MDM or MAM. Such an application may be preconfigured from a template HDX application to contain the icon of MICRSOFT Word (e.g., as a corresponding published app) and file type associations (FTAs) corresponding to DOC and DOCX. The application also may be preconfigured to launch an HDX session to a published and/or remote instance of MICROSOFT word when starting the native application.

In implementing one or more aspects of the disclosure, a template WorxWeb application may be configured with the icon of the WorkDay web application and may be further configured, upon start, to launch an HDX session to a published and/or remote browser with a URL pointing to the WorkDay web application. In this way, the user may be provided with both a native user experience and full-blown web application functionality.

Figure 9:
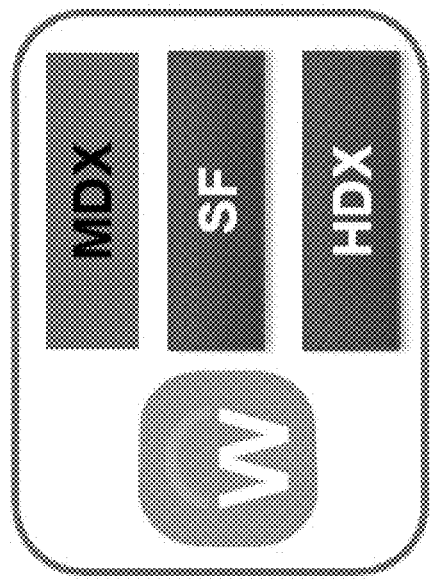

FIG. 9 illustrates an example of a mobile "web" application in accordance with one or more aspects of the disclosure.

Figure 10:
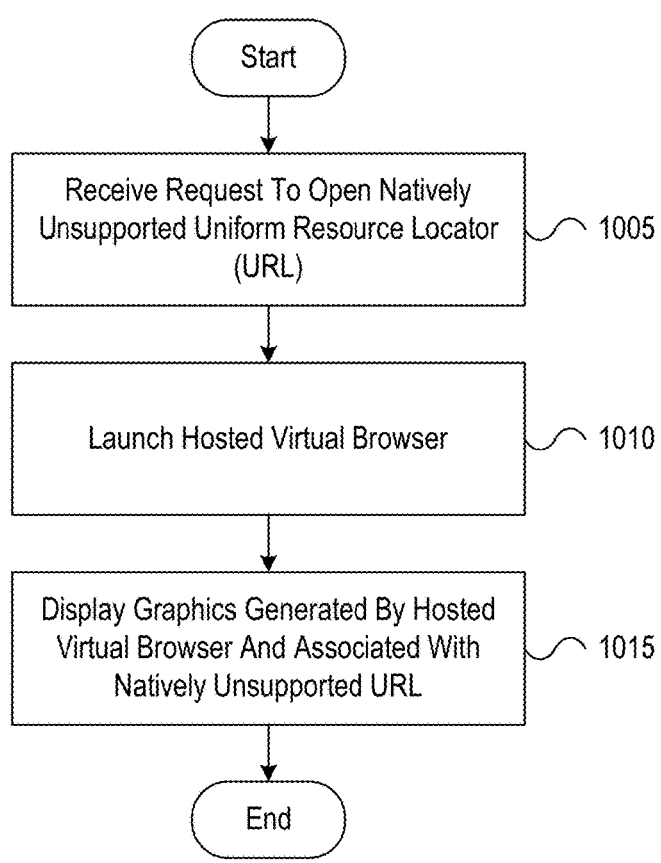
FIG. 10 depicts a method of integrating a virtual browser into a native browser and native web applications in accordance with one or more illustrative aspects described herein.

FIG. 10 depicts a method of integrating a virtual browser into a native browser and native web applications in accordance with one or more illustrative aspects described herein. In some embodiments, the method illustrated in FIG. 10 may be performed by a computing platform that incorporates, utilizes and/or includes one or more elements of the computer system architecture, remote-access system architecture, virtualized (hypervisor) system architecture, cloud-based system architecture, and/or enterprise mobility management systems discussed above in connection with FIGS. 1-6. For example, the method illustrated in FIG. 10 may be executed by a computing platform having at least one processor, a memory, and a communication interface. At step 1005, the computing platform may receive a request to open a natively unsupported uniform resource locator. At step 1010, in response to receiving the request to open the natively unsupported uniform resource locator, the computing platform may launch a hosted virtual browser application. At step 1015, the computing platform may display graphics generated by the hosted virtual browser application, and the graphics generated by the hosted virtual browser application may include content associated with the natively unsupported uniform resource locator.

Figure 11:
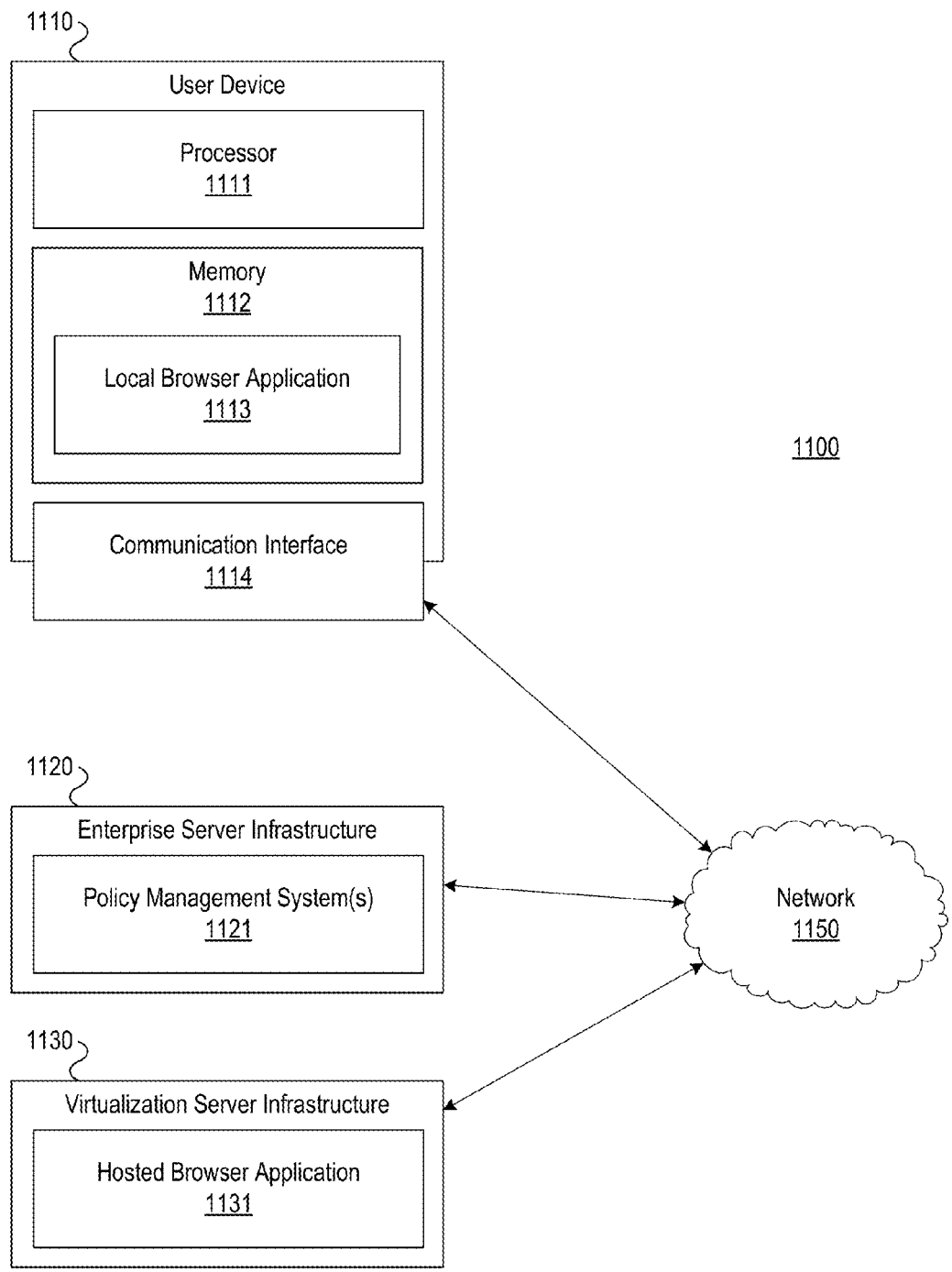
FIG. 11 depicts an illustrative computing environment for integrating a virtual browser into a native browser and native web applications in accordance with one or more illustrative aspects described herein.

FIG. 11 depicts an illustrative computing environment for integrating a virtual browser into a native browser and native web applications in accordance with one or more illustrative aspects described herein. Referring to FIG. 11, computing environment 1100 may include a user computing device 1110, enterprise server infrastructure 1120, virtualization server infrastructure 1130, and a network 1150. User computing device 1110, enterprise server infrastructure 1120, and virtualization server infrastructure 1130 may include one or more physical components, such as one or more processors, memories, communication interfaces, and/or the like. In addition, user computing device 1110 may include, incorporate, and/or implement one or more aspects of the client devices, mobile devices, and/or user devices discussed above. Enterprise server infrastructure 1120 may include, incorporate, and/or implement one or more aspects of the enterprise systems and/or management servers discussed above. Virtualization server infrastructure 1130 may include, incorporate, and/or implement one or more aspects of the virtualization servers and/or other virtualization infrastructure discussed above.

For example, user computing device 1110 may include a processor 1111, memory 1112, and communication interface 1114. Processor 1111 may execute instructions stored in memory 1112 to cause user computing device 1110 to perform one or more functions, such as executing an operating system and/or one or more applications, including a local browser application (which may, e.g., also be referred to as a "local browser" or "native browser") that may provide browsing functionality. Memory 1112 may store a local browser application 1113, which may include, incorporate, and/or implement one or more aspects of the secure and/or managed browser application discussed above (e.g., managed browser application 610) and which may provide browsing functionality, as illustrated in greater detail below. Communication interface 1114 may include one or more network interfaces via which user computing device 1110 can communicate with one or more other systems and/or devices in computing environment 1100, such as enterprise server infrastructure 1120, virtualization server infrastructure 1130, and/or one or more other systems and/or devices.

Enterprise server infrastructure 1120 may include and/or provide one or more policy management systems 1121 via which one or more mobile device management policies, mobile application management policies, and/or other enterprise policies may be defined, applied, enforced, updated, disabled, and/or otherwise controlled (e.g., with respect to one or more managed devices, including one or more managed user mobile devices). Virtualization server infrastructure 1130 may include, execute, and/or provide a hosted browser application 1131 (which may, e.g., be a remote and/or virtual application, similar to the hosted, remoted, and/or virtualized applications discussed above, and which may, e.g., be used to render and/or provide natively unsupported content to one or more user devices, as illustrated in greater detail below). Network 1150 may include one or more local area networks, wide area networks, public networks, private networks, and/or sub-networks and may interconnect user computing device 1110, enterprise server infrastructure 1120, virtualization server infrastructure 1130.

Figure 12B:
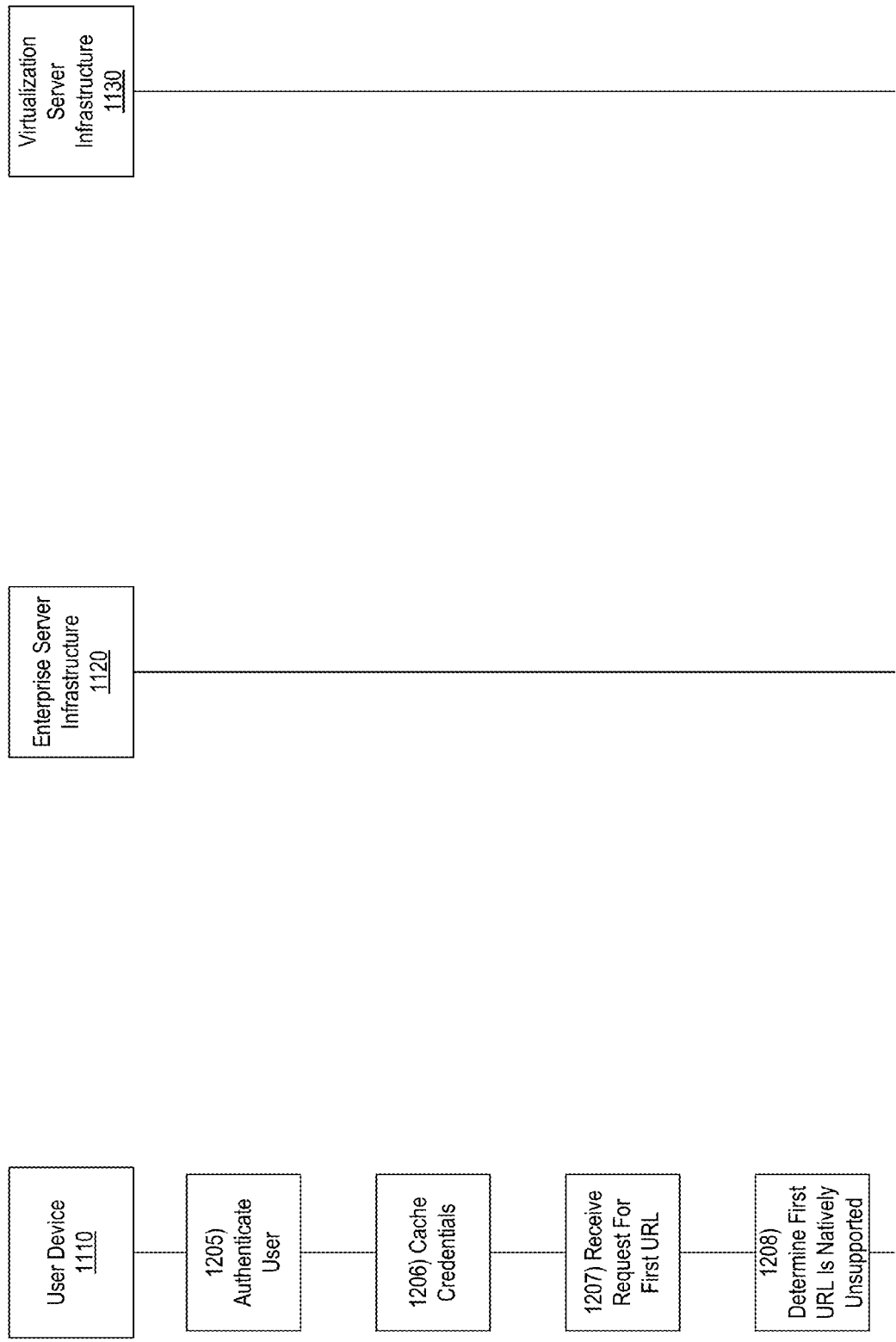

FIGS. 12A-12F depict an example event sequence for integrating a virtual browser into a native browser and native web applications in accordance with one or more illustrative aspects described herein. Referring to FIG. 12A, at step 1201, enterprise server infrastructure 1120 may receive input defining one or more policies (e.g., from one or more policy administrators and/or other administrative users). For example, enterprise server infrastructure 1120 may receive input defining one or more mobile device management policies, one or more mobile device application policies, and/or one or more other enterprise policies (which may, e.g., be specific to and/or otherwise associated with an organization operating enterprise server infrastructure 1120, such as an enterprise organization with which a user of user computing device 1110 is employed by and/or otherwise associated with). In some instances, the one or more policies defined at step 1201 may specify one or more natively unsupported uniform resource locators that are to be opened on a hosted browser instead of a local browser, as illustrated in greater detail below.

At step 1202, enterprise server infrastructure 1120 may provision one or more user devices (e.g., based on the one or more policies defined at step 1201). For example, at step 1202, enterprise server infrastructure 1120 may send one or more new policies and/or policy updates to one or more user devices, including user computing device 1110 and/or one or more other user devices, to provision such user devices with the one or more policies.

At step 1203, user computing device 1110 may receive one or more policies from enterprise server infrastructure 1120. For example, at step 1203, user computing device 1110 may receive, via a communication interface (e.g., communication interface 1114), from an enterprise server (e.g., enterprise server infrastructure 1120), one or more enterprise policies, and the one or more enterprise policies may include at least one enterprise policy defining one or more natively unsupported uniform resource locators. As illustrated in greater detail below, enforcing such an enterprise policy may direct, control, and/or otherwise cause user computing device 1110 to launch a hosted browser session when such a natively unsupported uniform resource locator is requested on user computing device 1110, so as to enable content corresponding to the natively unsupported uniform resource locator to be remotely rendered in a hosted session (e.g., by virtualization server infrastructure 1130) and locally displayed on the user device (e.g., user computing device 1110).

At step 1204, user computing device 1110 may store the one or more policies received from enterprise server infrastructure 1120. For example, at step 1204, user computing device 1110 may store the one or more enterprise policies for enforcement on the computing device (e.g., user computing device 1110) by at least one policy management agent. Such a policy management agent may be run on and/or be executed by user computing device 1110 and may include, incorporate, and/or implement one or more aspects of the client agent discussed above (e.g., client agent 604). Additionally or alternatively, such a policy management agent may be integrated into a local browser on user computing device 1110 and/or an enterprise portal application on user computing device 1110 (e.g., into which such a local browser itself may be integrated).

Referring to FIG. 12B, at step 1205, user computing device 1110 may authenticate a user of user computing device 1110. For example, at step 1205, user computing device 1110 may authenticate a user of the computing device (e.g., user computing device 1110). User computing device 1110 may authenticate the user based on validating a username entered by the user, a password entered by the user, biometric input provided by the user, and/or other input provided by the user. At step 1206, user computing device 1110 may cache one or more credentials linked to and/or otherwise associated with the user authenticated at step 1205. For example, at step 1206, based on authenticating the user of the computing device (e.g., user computing device 1110), user computing device 1110 may cache one or more authentication credentials associated with the user of the computing device (e.g., user computing device 1110). In caching the one or more authentication credentials associated with the user of the computing device (e.g., user computing device 1110), user computing device 1110 may store in a keychain and/or otherwise cache one or more single sign-on (SSO) credentials linked to an enterprise user account associated with the user of the computing device (e.g., user computing device 1110). In some instances, such a single sign-on (SSO) credential may be usable by user computing device 1110 and/or enable user computing device 1110 to login to a virtualization server, such as virtualization server infrastructure 1130, and initiate a hosted browser session linked to the enterprise user account.

At step 1207, user computing device 1110 may receive a request for a first uniform resource locator. For example, at step 1207, user computing device 1110 may receive a request to open a first uniform resource locator. Such a request may, for instance, correspond to and/or be included in user input received from a user of user computing device 1110. At step 1208, user computing device 1110 may determine that the first uniform resource locator is natively unsupported. For example, at step 1208, user computing device 1110 may determine that the first uniform resource locator is natively unsupported based on one or more policies and/or other information maintained and/or determined by user computing device 1110.

In some embodiments, determining that the first uniform resource locator is natively unsupported may include determining that the first uniform resource locator is natively unsupported based on at least one enterprise policy defining one or more natively unsupported uniform resource locators. For example, in determining that the first uniform resource locator is natively unsupported, user computing device 1110 may determine that the first uniform resource locator is natively unsupported based on at least one enterprise policy defining one or more natively unsupported uniform resource locators. Such an enterprise policy may, for instance, define a blacklist and/or whitelist of natively unsupported uniform resource locators, natively supported uniform resource locators, and/or other uniform resource locators. In addition, user computing device 1110 may, for instance, determine that the first uniform resource locator is natively unsupported based on the first uniform resource locator being identified by the at least one enterprise policy and/or included in a list of natively unsupported uniform resource locators specified by the at least one enterprise policy, and this determination may cause user computing device 1110 to launch a hosted session for rendering content associated with the first uniform resource locator, as illustrated in greater detail below.

In some embodiments, determining that the first uniform resource locator is natively unsupported may include determining that the first uniform resource locator is natively unsupported based on detecting a failure to load one or more elements associated with the first uniform resource locator. For example, in determining that the first uniform resource locator is natively unsupported, user computing device 1110 may determine that the first uniform resource locator is natively unsupported based on user computing device 1110 detecting a failure to load one or more elements associated with the first uniform resource locator. For instance, user computing device 1110 initially may attempt to access the first uniform resource locator and subsequently may detect that one or more content items, scripts, plug-ins, and/or other elements associated with the first uniform resource locator cannot be loaded and/or are otherwise failing to load. In response to detecting that the one or more content items, scripts, plug-ins, and/or other elements associated with the first uniform resource locator cannot be loaded and/or are otherwise failing to load, user computing device 1110 may determine that the first uniform resource locator is natively unsupported (which may, e.g., cause user computing device 1110 to launch a hosted session for rendering content associated with the first uniform resource locator, as illustrated in greater detail below).

In some embodiments, determining that the first uniform resource locator is natively unsupported may include determining that the first uniform resource locator is natively unsupported based on identifying that the first uniform resource locator corresponds to a stub application associated with a hosted web application. For example, in determining that the first uniform resource locator is natively unsupported, user computing device 1110 may determine that the first uniform resource locator is natively unsupported based on identifying that the first uniform resource locator corresponds to a stub application associated with a hosted web application. Such a stub application may, for instance, be configured to open the first uniform resource locator in a local browser and may include one or more command-line options and/or other embedded commands that may cause the local browser to identify the first uniform resource locator as natively unsupported, which in turn may cause user computing device 1110 to launch a hosted session for rendering content associated with the first uniform resource locator, as illustrated in greater detail below.

Figure 12C:
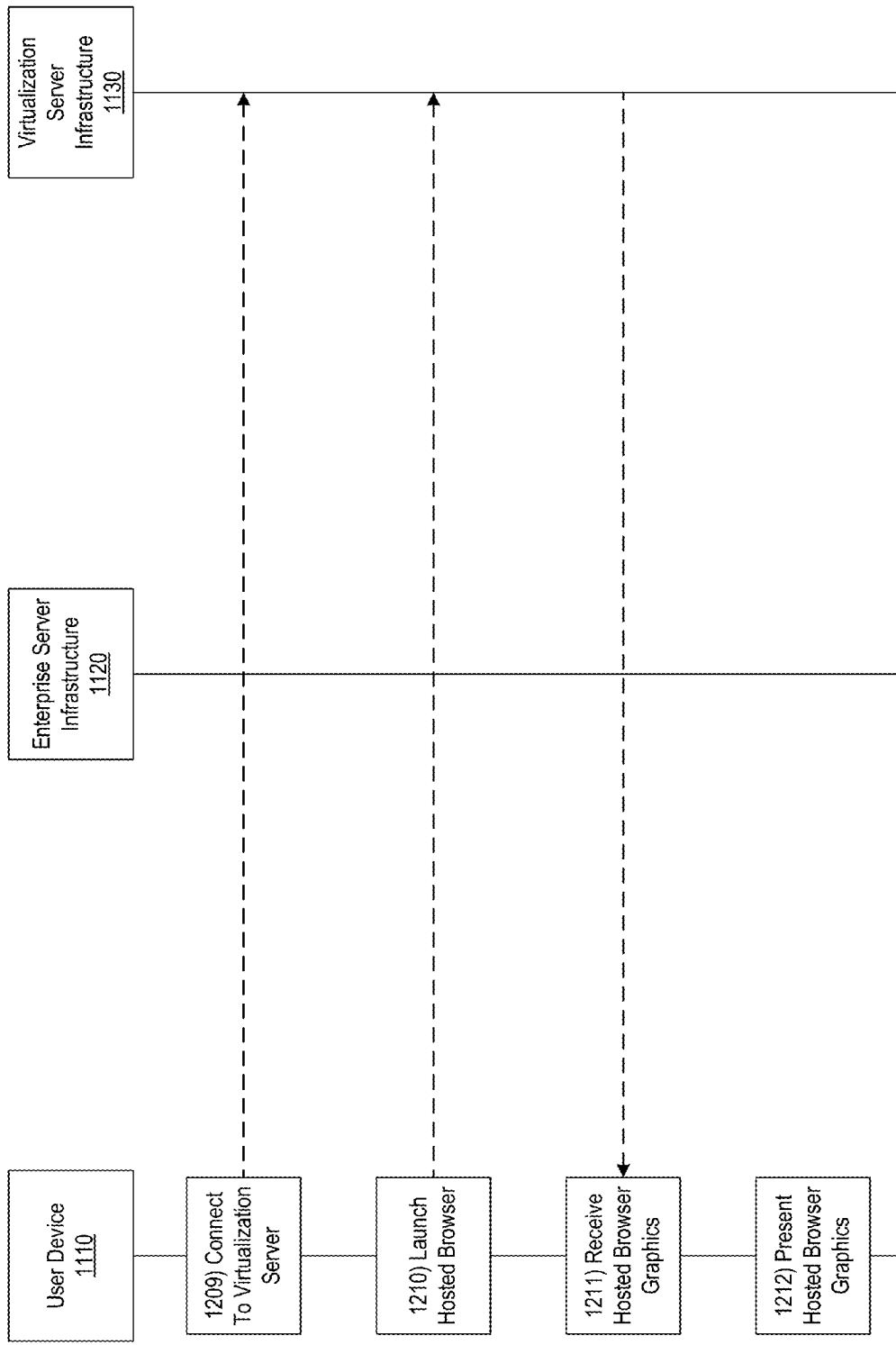

Referring to FIG. 12C, at step 1209, user computing device 1110 may connect to virtualization server infrastructure 1130 (e.g., in response to and/or otherwise based on determining that the first uniform resource locator is natively unsupported at step 1208). At step 1210, user computing device 1110 may launch a hosted browser in a hosted session (e.g., by directing, commanding, and/or otherwise controlling virtualization server infrastructure 1130 to launch an instance of a hosted browser in a hosted session being provided by virtualization server infrastructure 1130). For example, at step 1210, based on determining that the first uniform resource locator is natively unsupported, user computing device 1110 may launch a hosted virtual browser application (e.g., hosted browser application 1131) in a virtual session hosted by a virtualization server (e.g., virtualization server infrastructure 1130).

In some embodiments, launching the hosted virtual browser application in the virtual session hosted by the virtualization server may include establishing a connection to the virtualization server and authenticating with the virtualization server using one or more cached authentication credentials. For example, in launching the hosted virtual browser application in the virtual session hosted by the virtualization server (e.g., virtualization server infrastructure 1130), user computing device 1110 may establish a connection to the virtualization server (e.g., virtualization server infrastructure 1130) and authenticate with the virtualization server (e.g., virtualization server infrastructure 1130) using one or more cached authentication credentials (e.g., the credentials cached at step 1206).

In some embodiments, authenticating with the virtualization server using the one or more cached authentication credentials may include authenticating with the virtualization server using at least one cached single sign-on (SSO) credential linked to an enterprise user account. For example, in authenticating with the virtualization server (e.g., virtualization server infrastructure 1130) using the one or more cached authentication credentials (e.g., at step 1210), user computing device 1110 may authenticate with the virtualization server using at least one cached single sign-on (SSO) credential linked to an enterprise user account. For instance, user computing device 1110 may authenticate with the virtualization server using at least one cached single sign-on (SSO) credential linked to an enterprise user account by submitting such an SSO credential to virtualization server infrastructure 1130 for validation, and the SSO credential may have been cached by user computing device 1110 at step 1206, as discussed above. Additionally or alternatively, the SSO credential may be linked to an enterprise user account that is associated with the user of user computing device 1110 and that allows the user of user computing device 1110 to selectively access one or more protected enterprise resources, such as an enterprise application store, an enterprise file sharing platform, an enterprise cloud storage platform, and/or other enterprise resources.

At step 1211, user computing device 1110 may receive hosted browser graphics from virtualization server infrastructure 1130. For example, at step 1211, user computing device 1110 may receive, via the communication interface (e.g., communication interface 1114), from the virtualization server (e.g., virtualization server infrastructure 1130), first hosted browser graphics generated by the hosted virtual browser application (e.g., hosted browser application 1131). In addition, the first hosted browser graphics generated by the hosted virtual browser application (e.g., hosted browser application 1131) may include content associated with the first uniform resource locator. Thus, hosted browser application 1131 on virtualization server infrastructure 1130 may access and/or render the content associated with the first uniform resource locator that is natively unsupported on user computing device 1110, and subsequently, hosted browser application 1131 on virtualization server infrastructure 1130 may send the rendered content associated with the first uniform resource locator to user computing device 1110 for display (e.g., in a local browser on user computing device 1110, such as in local browser application 1113).

Figure 13:
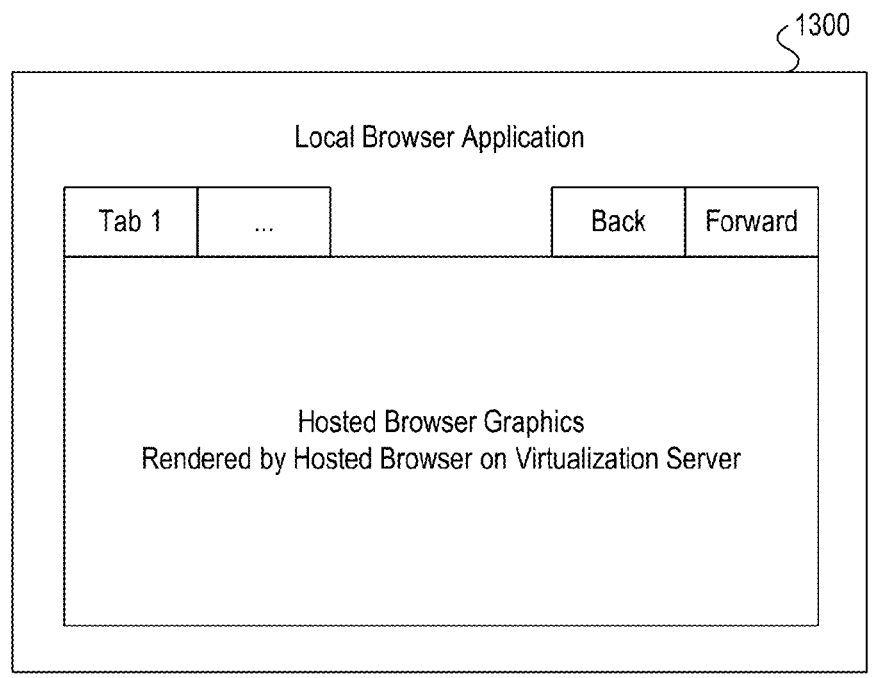
FIGS. 13 and 14 depict example graphical user interfaces for integrating a virtual browser into a native browser and native web applications in accordance with one or more illustrative aspects described herein.

At step 1212, user computing device 1110 may present the hosted browser graphics received from virtualization server infrastructure 1130. For example, at step 1212, user computing device 1110 may present the first hosted browser graphics generated by the hosted virtual browser application (e.g., hosted browser application 1131 executing on virtualization server infrastructure 1130). In presenting the hosted browser graphics generated by the hosted virtual browser application, user computing device 1110 may display and/or otherwise present a graphical user interface similar to graphical user interface 1300, which is illustrated in FIG. 13. As seen in FIG. 13, graphical user interface 1300 may include user interface elements, controls, and/or other content associated with a local browser application (e.g., tab listing, back button, forward button, and/or other elements) and also hosted browser graphics rendered by a hosted browser on virtualization server infrastructure 1130 and displayed by the local browser application on user computing device 1110.

In some embodiments, presenting the first hosted browser graphics generated by the hosted virtual browser application may include maintaining a stack of browsing transitions associated with browsing activity. For example, in presenting the first hosted browser graphics generated by the hosted virtual browser application (e.g., hosted browser application 1131 executing on virtualization server infrastructure 1130), user computing device 1110 may maintain a stack of browsing transitions associated with browsing activity. In maintaining a stack of browsing transitions associated with browsing activity, user computing device 1110 may track and/or store information identifying pages accessed and/or transitions between pages, including local browsing activity in the local browser executing on user computing device 1110 and remote browsing activity in the hosted virtual browser executing on virtualization server infrastructure 1130. User computing device 1110 may maintain such a stack of browsing transitions to enable back and/or forward navigation functionality, history tracking functionality, and/or other functionality in the local browser and/or in the hosted browser. In some instances, such a stack of browsing transitions may similarly be maintained on virtualization server infrastructure 1130 in addition to or instead of the stack of browsing transitions that may be maintained on user computing device 1110.

Figure 12D:
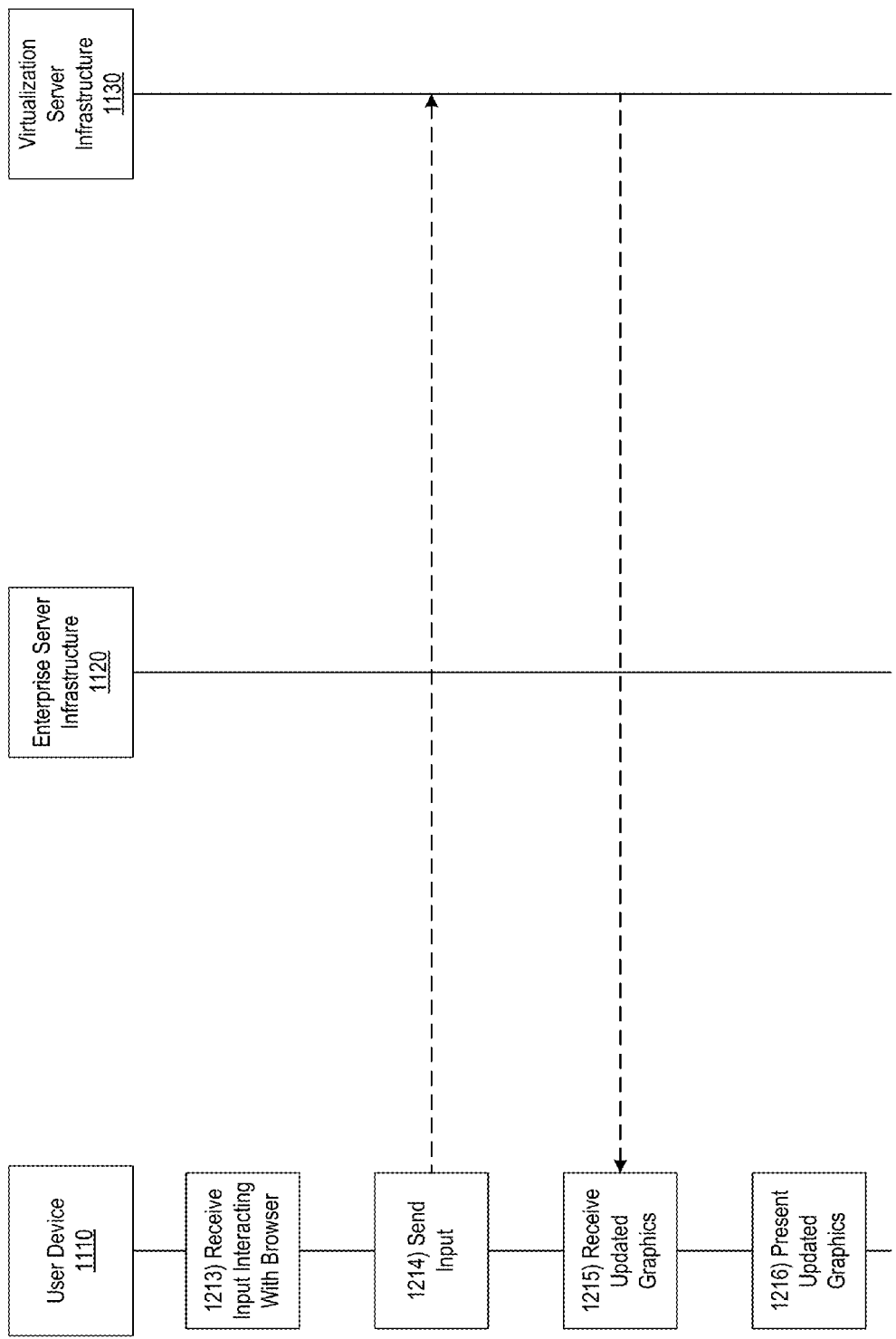

Referring to FIG. 12D, at step 1213, user computing device 1110 may receive input (e.g., from the user of user computing device 1110) interacting with the hosted browser graphics (which may, e.g., be presented by the local browser executing on user computing device 1110). For example, at step 1213, user computing device 1110 may receive input interacting with the first hosted browser graphics generated by the hosted virtual browser application (e.g., hosted browser application 1131 executing on virtualization server infrastructure 1130) and presented by the computing device (e.g., user computing device 1110). Such input may, for instance, include a user invoking and/or otherwise selecting a link included in the hosted browser graphics, interacting with a form or other control included in the hosted browser graphics, and/or otherwise interacting with an element included in the hosted browser graphics.

In some embodiments, receiving the input interacting with the first hosted browser graphics generated by the hosted virtual browser application and presented by the computing device may include updating a stack of browsing transitions based on the input interacting with the first hosted browser graphics generated by the hosted virtual browser application and presented by the computing device. For example, in receiving the input interacting with the first hosted browser graphics generated by the hosted virtual browser application (e.g., hosted browser application 1131 executing on virtualization server infrastructure 1130) and presented by the computing device (e.g., user computing device 1110), user computing device 1110 may update a stack of browsing transitions based on the input interacting with the first hosted browser graphics generated by the hosted virtual browser application (e.g., hosted browser application 1131 executing on virtualization server infrastructure 1130) and presented by the computing device (e.g., user computing device 1110). For instance, if the input includes a selection of a link and/or a transition to a new page associated with the link, user computing device 1110 may update the stack of browsing transitions to include information identifying the selection of the link and/or the transition to the new page associated with the link.

At step 1214, user computing device 1110 may send the input interacting with the hosted browser graphics to virtualization server infrastructure 1130. For example, at step 1214, user computing device 1110 may send, via the communication interface (e.g., communication interface 1114), to the virtualization server (e.g., virtualization server infrastructure 1130), the input interacting with the first hosted browser graphics generated by the hosted virtual browser application (e.g., hosted browser application 1131 executing on virtualization server infrastructure 1130) and presented by the computing device (e.g., user computing device 1110). At step 1215, user computing device 1110 may receive updated browser graphics from virtualization server infrastructure 1130. For example, at step 1215, user computing device 1110 may receive, via the communication interface (e.g., communication interface 1114), from the virtualization server (e.g., virtualization server infrastructure 1130), updated hosted browser graphics generated by the hosted virtual browser application (e.g., hosted browser application 1131 executing on virtualization server infrastructure 1130). For instance, hosted browser application 1131 executing on virtualization server infrastructure 1130 may render and/or otherwise generate updated graphics based on the input received from user computing device 1110 and subsequently may send such updated graphics back to user computing device 1110 for display. At step 1216, user computing device 1110 may present the updated browser graphics received from virtualization server infrastructure 1130. For example, at step 1216, user computing device 1110 may present the updated hosted browser graphics generated by the hosted virtual browser application (e.g., hosted browser application 1131 executing on virtualization server infrastructure 1130).

Referring to FIG. 12E, at step 1217, user computing device 1110 may receive a request for a second uniform resource locator. For example, at step 1217, user computing device 1110 may receive a request to open a second uniform resource locator. Such a request may, for instance, correspond to and/or be included in user input received from a user of user computing device 1110. In some instances, user computing device 1110 may receive a request to open the second uniform resource locator in a new tab different from the tab in which the hosted graphics associated with the first uniform resource locator are presented. Additionally or alternatively, user computing device 1110 may track content displayed on and/or browsing transitions between different tabs of the local browser executed on user computing device 1110.

At step 1218, user computing device 1110 may determine that the second uniform resource locator is natively unsupported. For example, at step 1218, user computing device 1110 may determine that the second uniform resource locator is natively unsupported similar to how user computing device 1110 determined that the first uniform resource locator was natively unsupported (e.g., based on one or more policies, based on detecting a failure to load, based on identifying that the second uniform resource locator corresponds to a stub application associated with a hosted web application, and/or based on other information maintained and/or determined by user computing device 1110).

At step 1219, user computing device 1110 may launch an additional instance of the hosted browser in the hosted session (e.g., by directing, commanding, and/or otherwise controlling virtualization server infrastructure 1130 to launch another instance of the hosted browser in the hosted session being provided by virtualization server infrastructure 1130). For example, at step 1219, based on determining that the second uniform resource locator is natively unsupported, user computing device 1110 may launch an additional instance of the hosted virtual browser application (e.g., hosted browser application 1131) in the virtual session hosted by the virtualization server (e.g., virtualization server infrastructure 1130).

At step 1220, user computing device 1110 may receive hosted browser graphics from virtualization server infrastructure 1130. For example, at step 1220, user computing device 1110 may receive, via the communication interface (e.g., communication interface 1114), from the virtualization server (e.g., virtualization server infrastructure 1130), second hosted browser graphics generated by the additional instance of the hosted virtual browser application (e.g., hosted browser application 1131). In addition, the second hosted browser graphics may include content associated with the second uniform resource locator. Thus, like with the first uniform resource locator, hosted browser application 1131 on virtualization server infrastructure 1130 may access and/or render the content associated with the second uniform resource locator that is natively unsupported on user computing device 1110, and subsequently, hosted browser application 1131 on virtualization server infrastructure 1130 may send the rendered content associated with the second uniform resource locator to user computing device 1110 for display (e.g., in the local browser on user computing device 1110, such as in local browser application 1113).

Figure 12F:
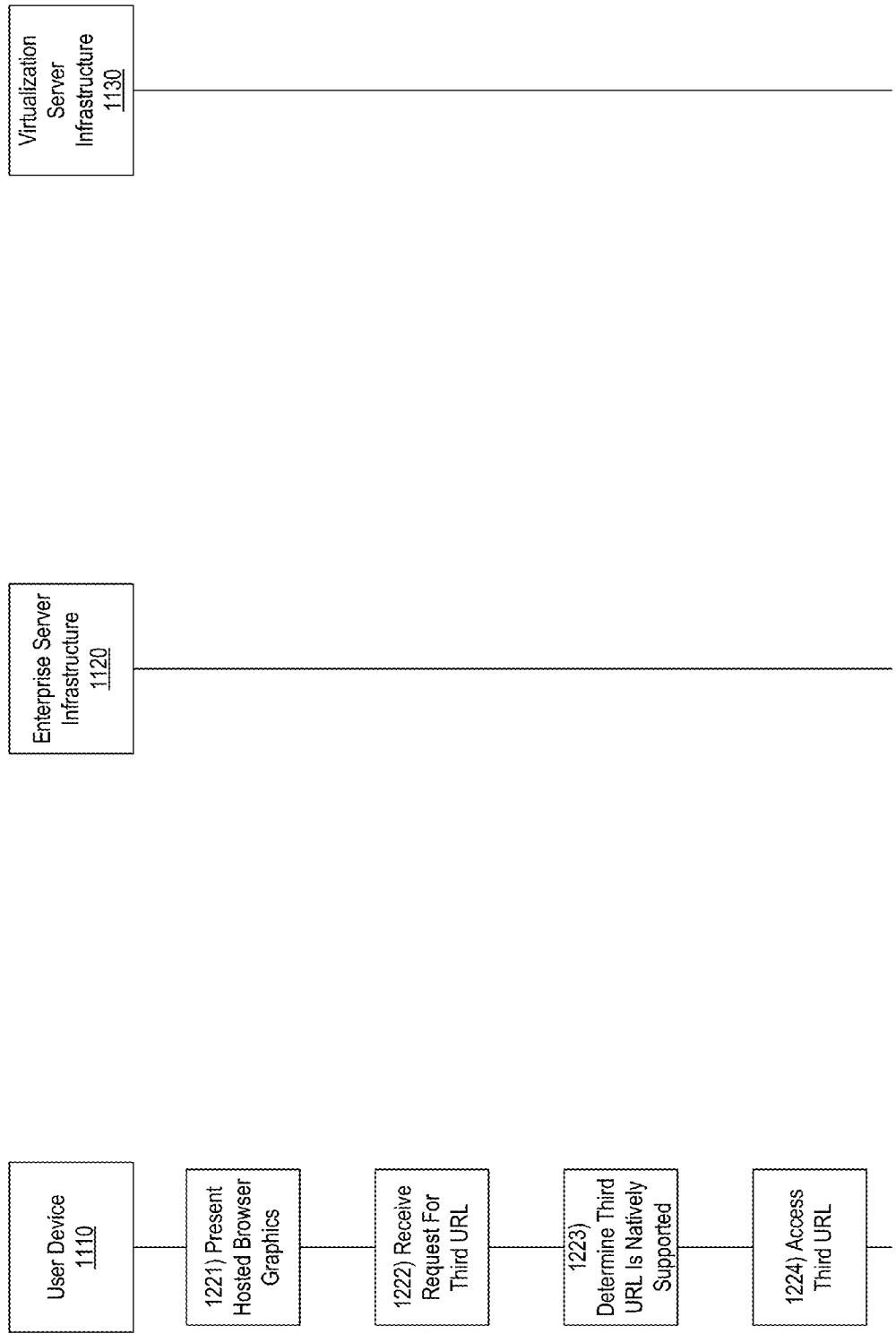

Referring to FIG. 12F, at step 1221, user computing device 1110 may present the hosted browser graphics received from virtualization server infrastructure 1130. For example, at step 1221, user computing device 1110 may present the second hosted browser graphics generated by the additional instance of the hosted virtual browser application (e.g., hosted browser application 1131 executing on virtualization server infrastructure 1130).

In some embodiments, presenting the first hosted browser graphics generated by the hosted virtual browser application may include presenting the first hosted browser graphics in a first tab of a local browser application, and presenting the second hosted browser graphics generated by the additional instance of the hosted virtual browser application may include presenting the second hosted browser graphics in a second tab of the local browser application different from the first tab of the local browser application. For example, in presenting the first hosted browser graphics generated by the hosted virtual browser application (e.g., hosted browser application 1131 executing on virtualization server infrastructure 1130), user computing device 1110 may present the first hosted browser graphics in a first tab of a local browser application (e.g., a first tab of local browser application 1113 executing on user computing device 1110). In addition, presenting the second hosted browser graphics generated by the additional instance of the hosted virtual browser application (e.g., the additional instance of hosted browser application 1131 executing on virtualization server infrastructure 1130), user computing device 1110 may present the second hosted browser graphics in a second tab of the local browser application (e.g., a second tab of local browser application 1113 executing on user computing device 1110) different from the first tab of the local browser application.

In some embodiments, presenting the second hosted browser graphics generated by the additional instance of the hosted virtual browser application may include maintaining a first stack of browsing transitions associated with first browsing activity in the first tab of the local browser application and maintaining a second stack of browsing transitions associated with second browsing activity in the second tab of the local browser application. For example, in presenting the second hosted browser graphics generated by the additional instance of the hosted virtual browser application (e.g., hosted browser application 1131 executing on virtualization server infrastructure 1130), user computing device 1110 may maintain a first stack of browsing transitions associated with first browsing activity in the first tab of the local browser application and may maintain a second stack of browsing transitions associated with second browsing activity in the second tab of the local browser application. User computing device 1110 may maintain such stacks of transitions similar to how user computing device 1110 may maintain a stack of transitions as in the examples discussed above.

At step 1222, user computing device 1110 may receive a request for a third uniform resource locator. For example, at step 1222, user computing device 1110 may receive a request to open a third uniform resource locator. Such a request may, for instance, correspond to and/or be included in user input received from a user of user computing device 1110. In some instances, user computing device 1110 may receive a request to open the third uniform resource locator in a new tab different from the tabs in which the hosted graphics associated with the first uniform resource locator and/or the hosted graphics associated with the second uniform resource locator are presented. Additionally or alternatively, user computing device 1110 may track content displayed on and/or browsing transitions between different tabs of the local browser executed on user computing device 1110.

Figure 14:
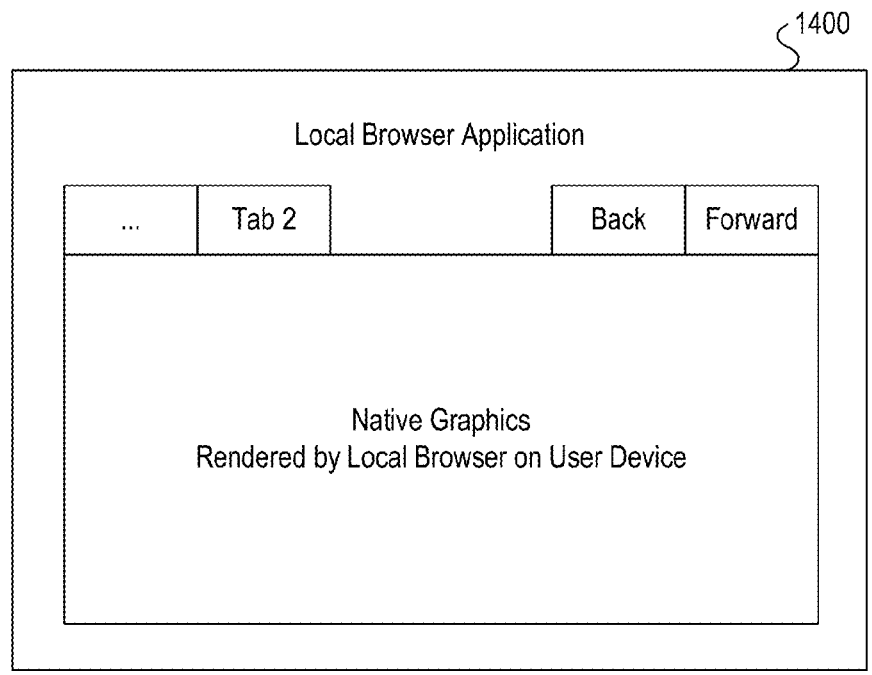

At step 1223, user computing device 1110 may determine that the third uniform resource locator is natively supported. For example, at step 1223, user computing device 1110 may determine that the third uniform resource locator is natively supported based on one or more policies and/or other information maintained and/or determined by user computing device 1110. At step 1224, user computing device 1110 may access the third uniform resource locator. For example, at step 1224, based on determining that the third uniform resource locator is natively supported, user computing device 1110 may access the third uniform resource locator using a local browser application (e.g., local browser application 1113). In accessing the third uniform resource locator, user computing device 1110 may, for instance, natively open and present content associated with the third uniform resource locator. For example, in accessing the third uniform resource locator, user computing device 1110 may display and/or otherwise present a graphical user interface similar to graphical user interface 1400, which is illustrated in FIG. 14. As seen in FIG. 14, graphical user interface 1400 may include user interface elements, controls, and/or other content associated with a local browser application (e.g., tab listing, back button, forward button, and/or other elements) and also native browser graphics rendered by the local browser application on user computing device 1110 and displayed by the local browser application on user computing device 1110.

Figure 15:
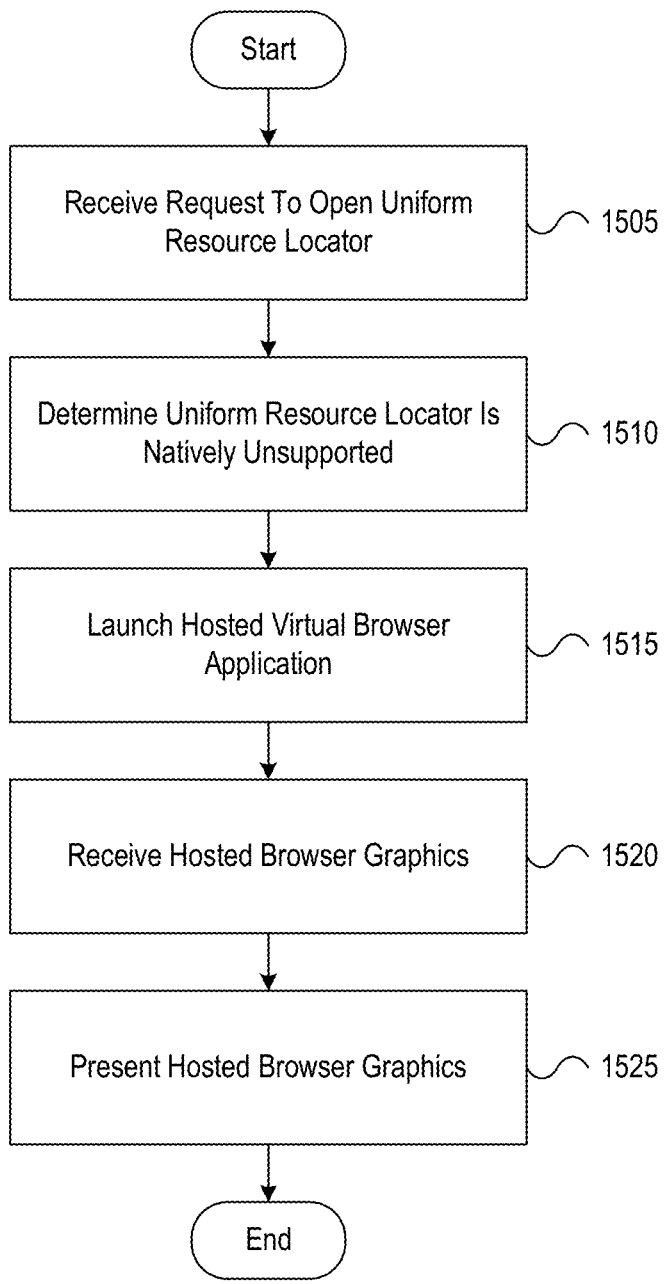
FIG. 15 depicts an example method of integrating a virtual browser into a native browser and native web applications in accordance with one or more illustrative aspects described herein.

FIG. 15 depicts an example method of integrating a virtual browser into a native browser and native web applications in accordance with one or more illustrative aspects described herein. Referring to FIG. 15, at step 1505, a computing device having at least one processor, a communication interface, and a memory may receive a request to open a first uniform resource locator. At step 1510, the computing device may determine that the first uniform resource locator is natively unsupported. At step 1515, based on determining that the first uniform resource locator is natively unsupported, the computing device may launch a hosted virtual browser application in a virtual session hosted by a virtualization server. At step 1520, the computing device may receive, via the communication interface, from the virtualization server, first hosted browser graphics generated by the hosted virtual browser application, and the first hosted browser graphics generated by the hosted virtual browser application may include content associated with the first uniform resource locator. At step 1525, the computing device may present the first hosted browser graphics generated by the hosted virtual browser application.

As illustrated above, various aspects of the disclosure relate to integrating a virtual browser into a native browser and native web applications. Although the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A computing device comprising:
   at least one processor;
   a communication interface communicatively coupled to the at least one processor; and
   memory storing computer-readable instructions that, when executed by the at least one processor, cause the computing device to:
      receive a request to open a first uniform resource locator;
      determine that the first uniform resource locator is natively unsupported;
      based on determining that the first uniform resource locator is natively unsupported, launch a hosted virtual browser application in a virtual session hosted by a virtualization server,
         wherein launching the hosted virtual browser application in the virtual session hosted by the virtualization server comprises establishing a connection to the virtualization server, authenticating with the virtualization server using one or more cached authentication credentials, and commanding the virtualization server to launch an instance of the hosted virtual browser application in the virtual session hosted by the virtualization server, and
         wherein authenticating with the virtualization server using the one or more cached authentication credentials comprises authenticating with the virtualization server using at least one cached single sign-on (SSO) credential linked to an enterprise user account;
      receive, via the communication interface, from the virtualization server, first hosted browser graphics generated by the hosted virtual browser application, the first hosted browser graphics generated by the hosted virtual browser application comprising content associated with the first uniform resource locator; and
      present the first hosted browser graphics generated by the hosted virtual browser application.

2. The computing device of claim 1, wherein determining that the first uniform resource locator is natively unsupported comprises determining that the first uniform resource locator is natively unsupported based on at least one enterprise policy defining one or more natively unsupported uniform resource locators.

3. The computing device of claim 1, wherein determining that the first uniform resource locator is natively unsupported comprises determining that the first uniform resource locator is natively unsupported based on detecting a failure to load one or more elements associated with the first uniform resource locator.

4. The computing device of claim 1, wherein determining that the first uniform resource locator is natively unsupported comprises determining that the first uniform resource locator is natively unsupported based on identifying that the first uniform resource locator corresponds to a stub application associated with a hosted web application.

5. The computing device of claim 1, wherein presenting the first hosted browser graphics generated by the hosted virtual browser application comprises maintaining a stack of browsing transitions associated with browsing activity.

6. The computing device of claim 1, wherein the memory stores additional computer-readable instructions that, when executed by the at least one processor, cause the computing device to:
   prior to receiving the request to open the first uniform resource locator:
      receive, via the communication interface, from an enterprise server, one or more enterprise policies, the one or more enterprise policies comprising at least one enterprise policy defining one or more natively unsupported uniform resource locators; and
      store the one or more enterprise policies for enforcement on the computing device by at least one policy management agent.

7. The computing device of claim 1, wherein the memory stores additional computer-readable instructions that, when executed by the at least one processor, cause the computing device to:
   prior to receiving the request to open the first uniform resource locator:
      authenticate a user of the computing device; and
      based on authenticating the user of the computing device, cache one or more authentication credentials associated with the user of the computing device.

8. The computing device of claim 1, wherein the memory stores additional computer-readable instructions that, when executed by the at least one processor, cause the computing device to:
   receive input interacting with the first hosted browser graphics generated by the hosted virtual browser application and presented by the computing device;
   send, via the communication interface, to the virtualization server, the input interacting with the first hosted browser graphics generated by the hosted virtual browser application and presented by the computing device;
   receive, via the communication interface, from the virtualization server, updated hosted browser graphics generated by the hosted virtual browser application; and
   present the updated hosted browser graphics generated by the hosted virtual browser application.

9. The computing device of claim 8, wherein receiving the input interacting with the first hosted browser graphics generated by the hosted virtual browser application and presented by the computing device comprises updating a stack of browsing transitions based on the input interacting with the first hosted browser graphics generated by the hosted virtual browser application and presented by the computing device.

10. The computing device of claim 1, wherein the memory stores additional computer-readable instructions that, when executed by the at least one processor, cause the computing device to:
receive a request to open a second uniform resource locator;
determine that the second uniform resource locator is natively unsupported;
based on determining that the second uniform resource locator is natively unsupported, launch an additional instance of the hosted virtual browser application in the virtual session hosted by the virtualization server;
receive, via the communication interface, from the virtualization server, second hosted browser graphics generated by the additional instance of the hosted virtual browser application, the second hosted browser graphics comprising content associated with the second uniform resource locator; and
present the second hosted browser graphics generated by the additional instance of the hosted virtual browser application.

11. The computing device of claim 10, wherein presenting the first hosted browser graphics generated by the hosted virtual browser application comprises presenting the first hosted browser graphics in a first tab of a local browser application, and wherein presenting the second hosted browser graphics generated by the additional instance of the hosted virtual browser application comprises presenting the second hosted browser graphics in a second tab of the local browser application different from the first tab of the local browser application.

12. The computing device of claim 11, wherein presenting the second hosted browser graphics generated by the additional instance of the hosted virtual browser application comprises maintaining a first stack of browsing transitions associated with first browsing activity in the first tab of the local browser application and maintaining a second stack of browsing transitions associated with second browsing activity in the second tab of the local browser application.

13. The computing device of claim 10, wherein the memory stores additional computer-readable instructions that, when executed by the at least one processor, cause the computing device to:
receive a request to open a third uniform resource locator;
determine that the third uniform resource locator is natively supported; and
based on determining that the third uniform resource locator is natively supported, access the third uniform resource locator using a local browser application.

14. A method, comprising:
at a computing device comprising at least one processor, memory, and a communication interface:
receiving, by the at least one processor, a request to open a first uniform resource locator;
determining, by the at least one processor, that the first uniform resource locator is natively unsupported;
based on determining that the first uniform resource locator is natively unsupported, launching, by the at least one processor, a hosted virtual browser application in a virtual session hosted by a virtualization server,
wherein launching the hosted virtual browser application in the virtual session hosted by the virtualization server comprises establishing a connection to the virtualization server, authenticating with the virtualization server using one or more cached authentication credentials, and commanding the virtualization server to launch an instance of the hosted virtual browser application in the virtual session hosted by the virtualization server, and
wherein authenticating with the virtualization server using the one or more cached authentication credentials comprises authenticating with the virtualization server using at least one cached single sign-on (SSO) credential linked to an enterprise user account;
receiving, by the at least one processor, via the communication interface, from the virtualization server, first hosted browser graphics generated by the hosted virtual browser application, the first hosted browser graphics generated by the hosted virtual browser application comprising content associated with the first uniform resource locator; and
presenting, by the at least one processor, the first hosted browser graphics generated by the hosted virtual browser application.

15. The method of claim 14, wherein determining that the first uniform resource locator is natively unsupported comprises determining that the first uniform resource locator is natively unsupported based on at least one enterprise policy defining one or more natively unsupported uniform resource locators.

16. The method of claim 14, wherein determining that the first uniform resource locator is natively unsupported comprises determining that the first uniform resource locator is natively unsupported based on detecting a failure to load one or more elements associated with the first uniform resource locator.

17. The method of claim 14, wherein determining that the first uniform resource locator is natively unsupported comprises determining that the first uniform resource locator is natively unsupported based on identifying that the first uniform resource locator corresponds to a stub application associated with a hosted web application.

18. The method of claim 14, wherein presenting the first hosted browser graphics generated by the hosted virtual browser application comprises maintaining a stack of browsing transitions associated with browsing activity.

19. The method of claim 14, comprising:
prior to receiving the request to open the first uniform resource locator:
receiving, by the at least one processor, via the communication interface, from an enterprise server, one or more enterprise policies, the one or more enterprise policies comprising at least one enterprise policy defining one or more natively unsupported uniform resource locators; and
storing, by the at least one processor, the one or more enterprise policies for enforcement on the computing device by at least one policy management agent.

20. One or more non-transitory computer-readable media storing instructions that, when executed by a computing device comprising at least one processor, memory, and a communication interface, cause the computing device to:
receive a request to open a first uniform resource locator;
determine that the first uniform resource locator is natively unsupported;

based on determining that the first uniform resource locator is natively unsupported, launch a hosted virtual browser application in a virtual session hosted by a virtualization server,
   wherein launching the hosted virtual browser application in the virtual session hosted by the virtualization server comprises establishing a connection to the virtualization server, authenticating with the virtualization server using one or more cached authentication credentials, and commanding the virtualization server to launch an instance of the hosted virtual browser application in the virtual session hosted by the virtualization server, and
   wherein authenticating with the virtualization server using the one or more cached authentication credentials comprises authenticating with the virtualization server using at least one cached single sign-on (SSO) credential linked to an enterprise user account;
receive, via the communication interface, from the virtualization server, first hosted browser graphics generated by the hosted virtual browser application, the first hosted browser graphics generated by the hosted virtual browser application comprising content associated with the first uniform resource locator; and
present the first hosted browser graphics generated by the hosted virtual browser application.

\* \* \* \* \*